United States Patent

Nakano et al.

(10) Patent No.: US 9,788,082 B2
(45) Date of Patent: Oct. 10, 2017

(54) TERMINAL DEVICE AND CONTROL METHOD

(71) Applicant: Panasonic Corporation, Osaka (JP)

(72) Inventors: Toshihisa Nakano, Osaka (JP); Masayuki Kozuka, Osaka (JP); Motoji Ohmori, Osaka (JP); Takeshi Matsuo, Nara (JP); Yoshiyuki Miyabe, Osaka (JP); Kazuhiro Tsuga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 21 days.

(21) Appl. No.: 14/345,055

(22) PCT Filed: Sep. 2, 2013

(86) PCT No.: PCT/JP2013/005159
§ 371 (c)(1),
(2) Date: Mar. 14, 2014

(87) PCT Pub. No.: WO2014/038170
PCT Pub. Date: Mar. 3, 2014

(65) Prior Publication Data
US 2015/0007220 A1    Jan. 1, 2015

Related U.S. Application Data

(60) Provisional application No. 61/696,589, filed on Sep. 4, 2012.

(51) Int. Cl.
*H04N 21/24* (2011.01)
*H04N 21/442* (2011.01)
(Continued)

(52) U.S. Cl.
CPC ......... *H04N 21/814* (2013.01); *H04N 21/443* (2013.01); *H04N 21/4424* (2013.01); *H04N 21/6332* (2013.01)

(58) Field of Classification Search
None
See application file for complete search history.

(56) References Cited

U.S. PATENT DOCUMENTS

2004/0214617 A1* 10/2004 Kanazawa .......... H04L 12/2823
455/574
2006/0005219 A1* 1/2006 Owens ................. G08B 27/008
725/33
(Continued)

FOREIGN PATENT DOCUMENTS

CN    102170499    8/2011
CN    202385234    8/2012
(Continued)

OTHER PUBLICATIONS

International Search Report dated Oct. 29, 2013 in International (PCT) Application No. PCT/JP2013/005159.
(Continued)

*Primary Examiner* — Brian T Pendleton
*Assistant Examiner* — Jean D Saint Cyr
(74) *Attorney, Agent, or Firm* — Wenderoth, Lind & Ponack, L.L.P.

(57) ABSTRACT

A terminal device has a network interface that forces network connection when not connected to a network. The terminal device that has a network interface includes a connection check unit that makes a check as to whether the terminal device is connected to a network, and an invalidation unit that, when the connection check unit judges that the
(Continued)

terminal device is not connected to the network as a result of the check, invalidates a function included in the terminal device.

11 Claims, 18 Drawing Sheets

(51) Int. Cl.
  *H04N 21/443* (2011.01)
  *H04N 21/488* (2011.01)
  *H04N 21/81* (2011.01)
  *H04N 21/6332* (2011.01)

(56) References Cited

U.S. PATENT DOCUMENTS

| | | | | |
|---|---|---|---|---|
| 2006/0200561 | A1* | 9/2006 | Tsuhara | H04L 12/1881 709/226 |
| 2009/0160868 | A1* | 6/2009 | Yato | 345/531 |
| 2010/0281498 | A1 | 11/2010 | Tanemura et al. | |
| 2011/0002662 | A1 | 1/2011 | Takao et al. | |
| 2011/0291974 | A1* | 12/2011 | Son et al. | 345/173 |
| 2012/0036284 | A1* | 2/2012 | Tao | H04N 21/43635 710/16 |
| 2012/0183278 | A1* | 7/2012 | Okamoto | H04N 7/1675 386/259 |
| 2014/0009268 | A1* | 1/2014 | Oshima | G08C 17/02 340/12.5 |

FOREIGN PATENT DOCUMENTS

| | | |
|---|---|---|
| JP | 2007-81669 | 3/2007 |
| JP | 2010-165014 | 7/2010 |
| JP | 2011-096360 | 5/2011 |
| JP | 4704452 | 6/2011 |

OTHER PUBLICATIONS

Office Action dated May 19, 2017 in corresponding Chinese Application No. 201380003370.4 with partial English translation.

* cited by examiner

Warning text

```
Your TV is not connected to network.
Please power on once again after connecting to network.

TV is automatically powered off after 10 seconds.
```

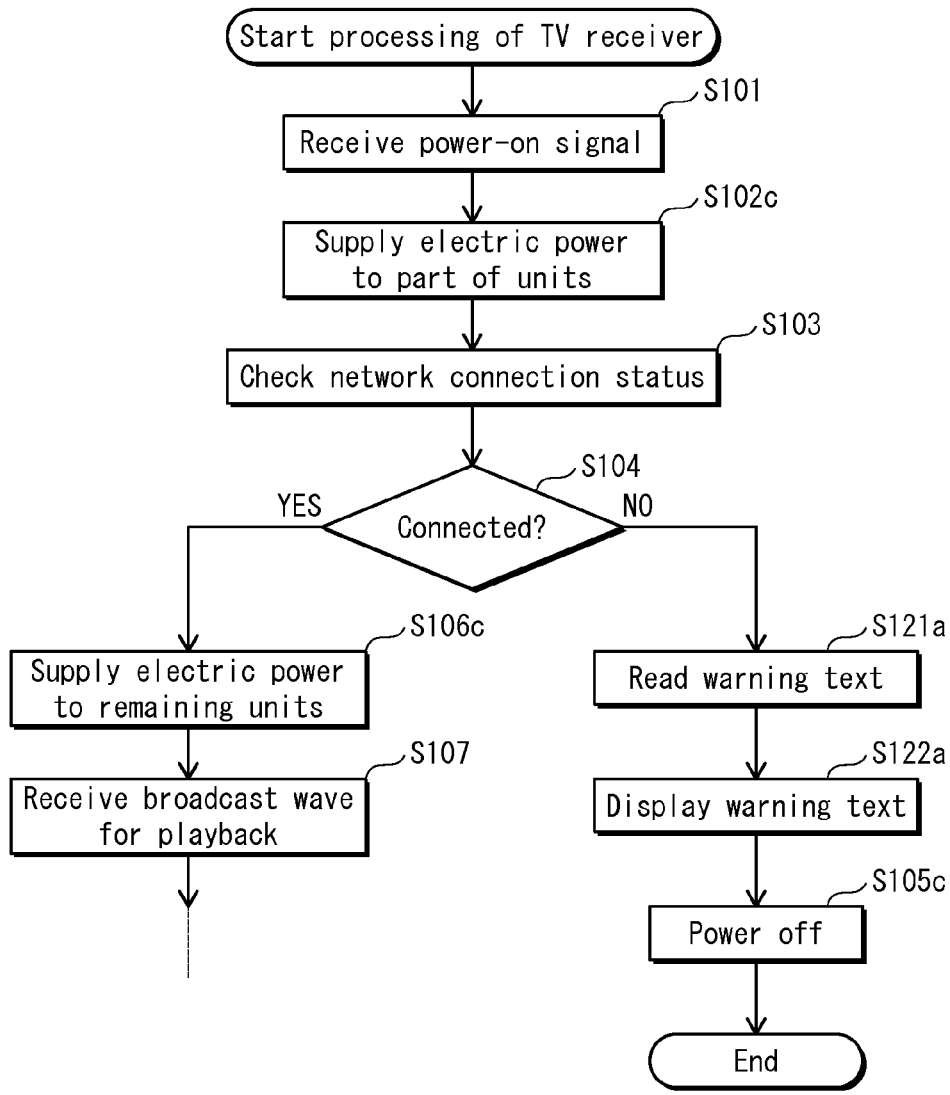

Network connection status table

| Connection information ||
|---|---|
| Connection time information | Connection status information |
| Last time | Connected |
| Two times before | Connected |
| Three times before | Connected |
| Four times before | Connected |
| Five times before | Connected |
| Six times before | Connected |
| Seven times before | Not connected |
| Eight times before | Not connected |
| Nine times before | Connected |
| Ten times before | Connected |

172 — Last time — 162
173 — Two times before — 163
174 — Three times before — 164
175 — Four times before — 165
176 — Five times before — 166
177 — Six times before — 167
178 — Seven times before — 168
179 — Eight times before — 169

TERMINAL DEVICE AND CONTROL METHOD

This application claims benefit to the U.S. Provisional Application No. 61/696,589, filed on Sep. 4, 2012.

The present invention relates to an art of forcing a terminal device that has a network interface but is not connected to a network to make network connection.

BACKGROUND ART

Terminal devices have become common that have a network interface and so on, and are connected to an external server device via a network to perform transmission and reception of information with the server device.

Such terminal devices are generally each a computer system that includes a processor and a memory. The terminal device achieves its function by the processor operating in accordance with the computer program stored in the memory.

There is a case where failure of the computer program is detected after shipping of the terminal device. In response to this case, an update program is downloaded from the server device thereby to solve the failure. Also, there is a case where a new function (new computer program) is developed after shipping of the terminal device. In response to this case, the new computer program is downloaded from the server device thereby to add the new function to the terminal device. Furthermore, inspection of the terminal device by the server device via a network allows early detection of a trouble of the terminal device.

Through connection of the terminal device to the server device via the network in this way, a user gets various benefits.

According to Patent Literature 1, there is a case where network connection is not normally performed due to release of a communication cable for network connection, inappropriate network settings, or the like. In such a case, an error screen regarding to network failure is displayed on a display unit. This notifies a user of the details of an error.

CITATION LIST

Patent Literature

[Patent Literature 1] Japanese Patent No. 4704452

SUMMARY OF INVENTION

Technical Problem

Only with display of the error screen disclosed in Patent Literature 1, however, it is impossible to force the user to connect the terminal device to the network. This causes the user to get disbenefits such as impossibility of updating the computer program, impossibility of adding a new function, and the like.

In order to solve the above problem, the present invention aims to provide a terminal device, a control method, and a recording medium that force the terminal device that has a network interface but is not connected to the network to make network connection.

In order to achieve the above aim, one aspect of the present invention provides a terminal device that has a network interface, the terminal device comprising: a connection check unit configured to make a check as to whether the terminal device is connected to a network; and an invalidation unit configured to, when the connection check unit judges that the terminal device is not connected to the network as a result of the check, invalidate a function included in the terminal device.

According to this aspect, when the terminal device is judged not to be connected to the network, the function included in the terminal device is invalidated. Accordingly, the user cannot use the function included in the terminal device, and the terminal device can make a strong appeal to the user that the terminal device is not connected to the network. It is necessary to connect the terminal device to the network in order for the user to use the function included in the terminal device. As a result, an effect is exhibited of forcing the user to connect the terminal device to the network.

BRIEF DESCRIPTION OF DRAWINGS

FIG. 8 shows a warning text 141 displayed on a TV receiver 100 as Modification (3).

FIG. 9 is a flow chart showing operations of the TV receiver 100 as Modification (3).

FIG. 10 shows a warning text 151 displayed on a TV receiver 100 as Modification (4).

FIG. 12 shows an example of a data structure of a network connection status table 161 in Modification (5).

FIG. 21 is a flow chart showing operations of a terminal device 100a.

DETAILED DESCRIPTION OF INVENTION

Figure 1:
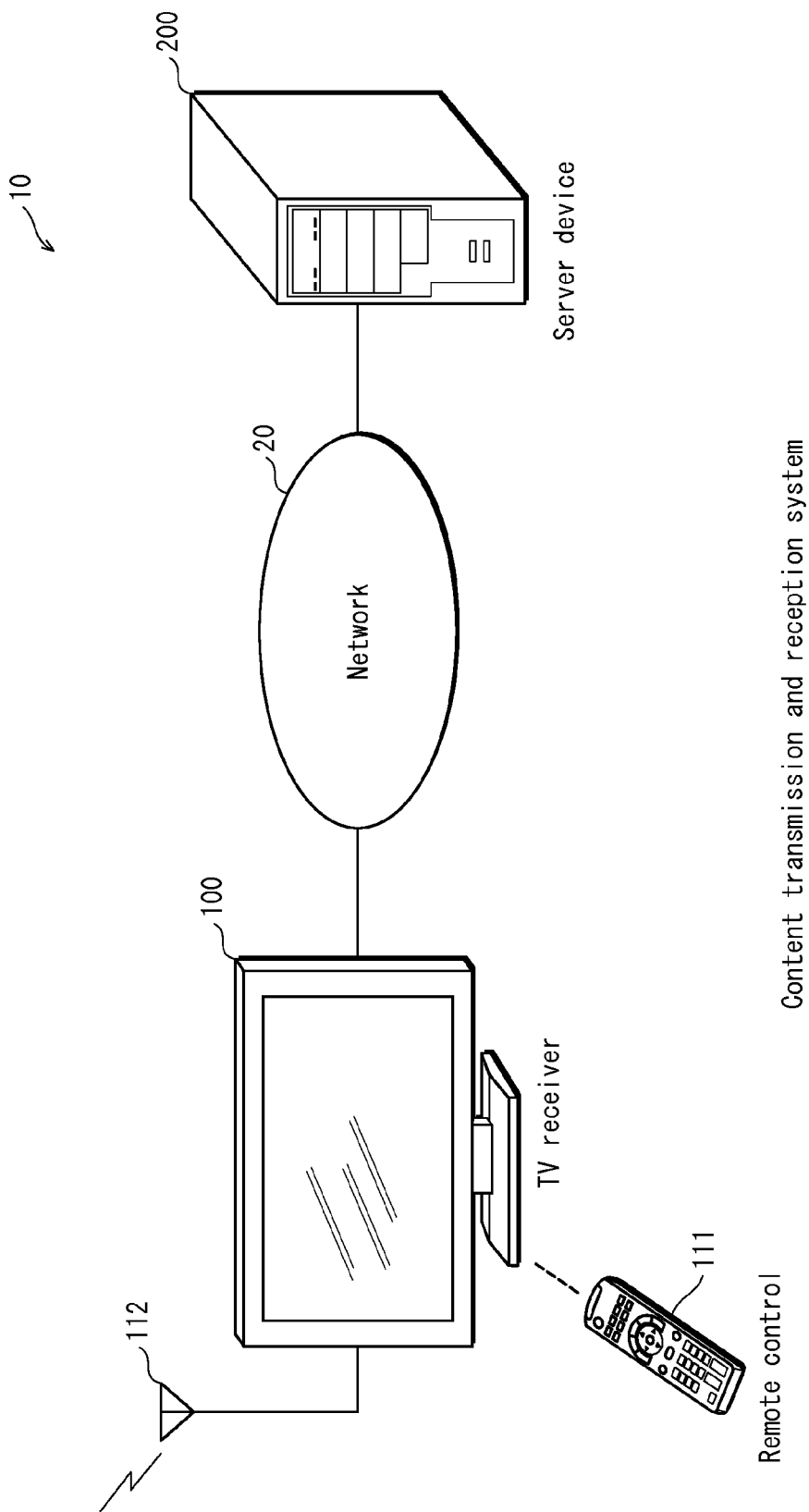
FIG. 1 shows a structure of a content transmission and reception system 10 as Embodiment 2 relating to the present invention.

One aspect of the present invention provides a terminal device that has a network interface, the terminal device comprising: a connection check unit configured to make a check as to whether the terminal device is connected to a network; and an invalidation unit configured to, when the connection check unit judges that the terminal device is not connected to the network as a result of the check, invalidate a function included in the terminal device.

According to this aspect, when the terminal device is judged not to be connected to the network, the function included in the terminal device is invalidated. Accordingly, a user cannot use the function included in the terminal device, and the terminal device can make a strong appeal to the user that the terminal device is not connected to the network. It is necessary to connect the terminal device to the network in order for the user to use the function included in the terminal device. As a result, an effect is exhibited of forcing the user to connect the terminal device to the network.

Here, when the connection check unit judges that the terminal device is not connected to the network, the invalidation unit may perform control to suspend supply of electrical power to the terminal device.

According to this structure, when the terminal device is judged not to be connected to the network, supply of electrical power to the terminal device is suspended. Accordingly, a user cannot use the function included in the terminal device, and the terminal device can make a strong appeal to the user that the terminal device is not connected to the network. It is necessary to connect the terminal device to the network in order for the user to use the terminal device. As a result, an effect is exhibited of forcing the user to connect the terminal device to the network.

Here, the terminal device may further comprise a reception unit configured to receive an operation instruction from a user, wherein when the operation instruction indicates to make an operation for power-on, the connection check unit may make the check immediately after supply of electrical power to the terminal device is commenced.

According to this structure, when an operation instruction indicating to make an operation for power-on is received, and the terminal device is judged not to be connected to the network, the function included in the terminal device is invalidated. Accordingly, the terminal device can make a strong appeal to the user that the terminal device is not connected to the network.

Here, the terminal device may be a broadcast wave reception device, and may further comprise: a reception unit configured to receive a broadcast wave; an extraction unit configured to extract a program from the received broadcast wave; and a playback unit configured to play back the extracted program, wherein during the check made by the connection check unit, the reception unit may receive the broadcast wave, the extraction unit may extract the program from the received broadcast wave, and the playback unit may play back the extracted program.

According to this structure, in a time period in which the connection check unit makes the check, the user can view the program extracted from the broadcast wave.

Here, the reception unit may receive the broadcast wave including natural disaster information that indicates a status of a natural disaster, the extraction unit may extract the natural disaster information from the received broadcast wave, and when the status indicated by the extracted natural disaster information does not satisfy a predetermined condition, the invalidation unit may invalidate the program playback unit so as not to play back the extracted natural disaster information.

According to this structure, when the status indicated by the acquired natural disaster information is lower than a threshold value, the invalidation unit invalidates the playback unit. Accordingly, it is possible to reduce harmful effects due to impossibility of displaying the natural disaster information.

Here, the terminal device may further comprise a playback unit configured to, when the connection check unit judges that the terminal device is not connected to the network, play back one of a special video and a warning text that indicate that the terminal device is not connected to the network, an after the playback unit plays back one of the special video and the warning text, the invalidation unit may invalidate the function included in the terminal device.

According to this structure, when the terminal device is judged not to be connected to the network, one of a special video and a warning text that indicate that the terminal device is not connected to the network is played back. This allows the user to know that the terminal device is not connected to the network.

Here, the terminal device may further comprise: a message playback unit configured to, when the connection check unit judges that the terminal device is not connected to the network, play back a message for inquiring of a user as to whether to make settings for network connection; and a reception unit configured to receive an operation instruction from the user, wherein when the received operation instruction indicates not to make the settings for network connection, the invalidation unit may invalidate the function included in the terminal device.

According to this structure, when the terminal device is judged not to be connected to the network, a message is played back for inquiring of the user as to whether to make settings for connecting the terminal device to the network, and an operation instruction is received from the user. This allows the user to respond the inquiry.

Here, the terminal device may further comprise a storage unit that stores therein, for each of a plurality of times of checks made by the connection check unit, a piece of connection information indicating whether the terminal device has been connected to the network, wherein when a rate of pieces of connection information indicating that the terminal device has been connected to the network among all of the pieces of connection information does not satisfy a predetermined condition, the invalidation unit may invalidate the function included in the terminal device.

According to this structure, when the terminal device is judged not to be connected to the network, the function included in the terminal device is invalidated if a rate of pieces of connection information indicating that the terminal device has been connected to the network is lower than a threshold value. Accordingly, the user cannot use the function included in the terminal device, and the terminal device can make a strong appeal to the user that the terminal device is not connected to the network.

Here, the terminal device may further comprise an acquisition unit configured to acquire permission information indicating whether to exempt the terminal device from function invalidation, wherein when the acquired permission information does not indicate to exempt the terminal device from function invalidation, the invalidation unit may invalidate the function included in the terminal device.

According to this structure, when the permission information does not indicate to exempt the terminal device from function invalidation, the function included in the terminal device is invalidated. Accordingly, the user cannot use the function included in the terminal device, and the terminal device can make a strong appeal to the user that the terminal device is not connected to the network.

Here, the terminal device may be a computer system that includes a memory unit that stores therein a control program and a processor that executes the control program, and may further comprise: an acquisition unit configured to acquire permission information; a playback unit configured to play back a message; and a reception unit configured to receive an operation instruction from a user, wherein the acquired permission information may include an update program for updating the control program, and indicate to exempt the terminal device from function invalidation on condition that the control program is updated with use of the update program, when the connection check unit judges that the terminal device is not connected to the network, the playback unit may play back the message for inquiring of the user as to whether to update the control program with use of the update program, and when the acquired permission information indicates to exempt the terminal device from function invalidation, and the operation instruction indicates not to update the control program, the invalidation unit may invalidate the function included in the terminal device.

According to this structure, when the operation instruction received from the user indicates not to update the control program though the permission information indicates to exempt the terminal device from function invalidation on condition that the control program is updated with use of the update program, the function included in the terminal device is invalidated. Accordingly, the user cannot use the function included in the terminal device, and the terminal device can make a strong appeal to the user that the terminal device is not connected to the network.

Another aspect of the present invention provides a control method for use in a terminal device that has a network interface, the control method comprising: checking whether the terminal device is connected to a network; and invalidating a function included in the terminal device when the terminal device is judged not to be connected to the network as a result of the checking.

According to this method, when the terminal device is judged not to be connected to the network, the function included in the terminal device is invalidated. Accordingly, the user cannot use the function included in the terminal device, and the terminal device can make a strong appeal to the user that the terminal device is not connected to the network. It is necessary to connect the terminal device to the network in order for the user to use the function included in the terminal device. As a result, an effect is exhibited of forcing the user to connect the terminal device to the network.

Another aspect of the present invention provides a computer-readable recording medium that records therein a computer program for control for use in a terminal device that has a network interface, the computer program causing the terminal device that is a computer to perform: checking whether the terminal device is connected to a network; and invalidating a function included in the terminal device when the terminal device is judged not to be connected to the network as a result of the checking.

According to execution of the computer program by the terminal device that is a computer, when the terminal device is judged not to be connected to the network, the function included in the terminal device is invalidated. Accordingly, the user cannot use the function included in the terminal device, and the terminal device can make a strong appeal to the user that the terminal device is not connected to the network. It is necessary to connect the terminal device to the network in order for the user to use the function included in the terminal device. As a result, an effect is exhibited of forcing the user to connect the terminal device to the network.

1. Embodiment 1

The following describes a terminal device 100a as Embodiment 1 relating to the present invention.

Figure 20:
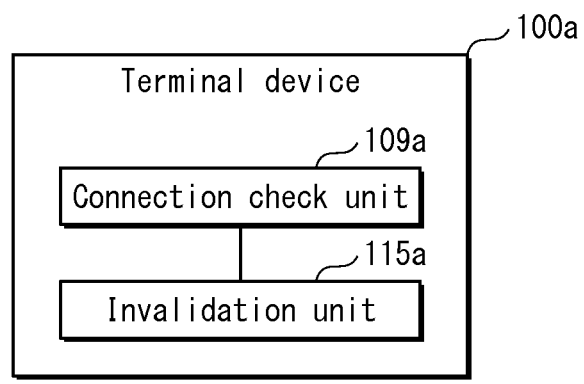
FIG. 20 shows a structure of a terminal device 100a as Embodiment 1 relating to the present invention.

(1) The terminal device 100a has a network interface, and includes a connection check unit 109a and an invalidation unit 115a as shown in FIG. 20.

The connection check unit 109a makes a check as to whether the terminal device 100a is connected to a network.

When the connection check unit 109a judges that the terminal device 100a is not connected to the network as a result of the check, the invalidation unit 115a invalidates a function included in the terminal device 100a.

Figure 21:
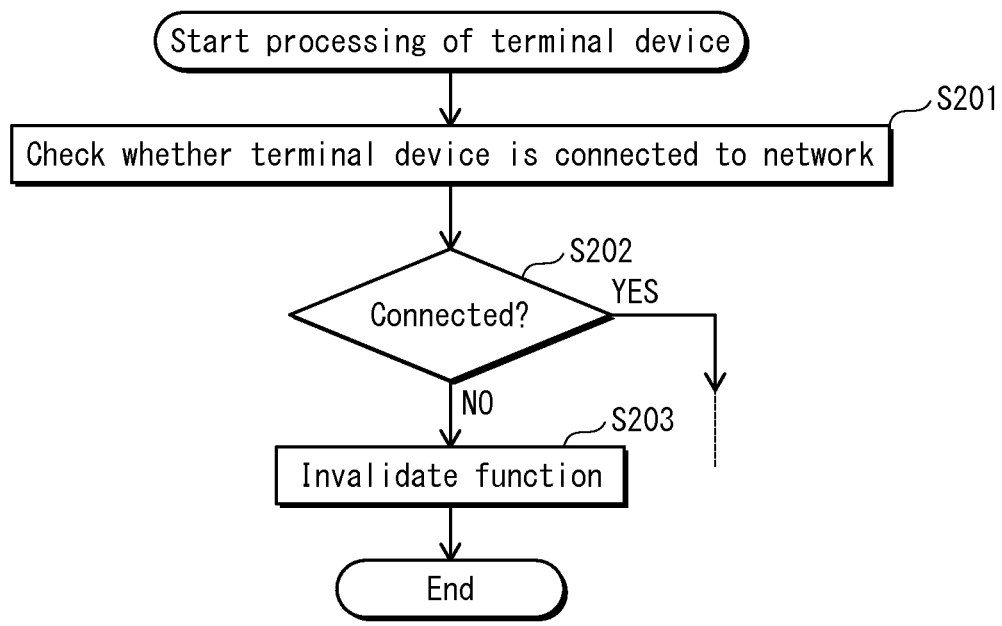

The following describes operations of the terminal device 100a with reference to a flow chart shown in FIG. 21.

The connection check unit 109a checks whether the terminal device 100a is connected to a network (Step S201).

When the connection check unit 109a judges that the terminal device 100a is not connected to the network (Step S202: NO), the invalidation unit 115a invalidates a function included in the terminal device 100a (Step S203).

(2) When the connection check unit 109a judges that the terminal device 100a is not connected to the network, the invalidation unit 115a may perform control to suspend supply of electrical power to the terminal device 100a.

(3) The terminal device 100a may further include a reception unit configured to receive an operation instruction from a user.

When the operation instruction indicates to make an operation for power-on, the connection check unit 109a makes the check immediately after supply of electrical power to the terminal device 100a is commenced.

(4) The terminal device 100a may be a broadcast wave reception device. The terminal device 100a includes: a reception unit configured to receive a broadcast wave; an extraction unit configured to extract a program from the received broadcast wave; and a program playback unit configured to play back the extracted program.

During the check made by the connection check unit 109a, the reception unit receives the broadcast wave, the extraction unit extracts the program from the received broadcast wave, and the playback unit plays back the extracted program.

(5) The reception unit may receive the broadcast wave including natural disaster information that indicates a status of a natural disaster. The extraction unit extracts the natural disaster information from the received broadcast wave.

When the status indicated by the extracted natural disaster information does not satisfy a predetermined condition, the invalidation unit 115a invalidates the program playback unit so as not to play back the extracted natural disaster information.

(6) The terminal device 100a may further include a playback unit configured to, when the connection check unit 109a judges that the terminal device 100a is not connected to the network, play back one of a special video and a warning text that indicate that the terminal device 100a is not connected to the network.

After the playback unit plays back one of the special video and the warning text, the invalidation unit 115a invalidates the function included in the terminal device 100a.

(7) The terminal device 100a may further include a playback unit configured to play back, when the connection check unit 109a judges that the terminal device 100a is not connected to the network, a message for inquiring a user as to whether to perform settings for network connection, and a reception unit configured to receive the operation instruction from the user.

When the received operation instruction indicates not to make the settings for network connection, the invalidation unit 115a invalidates the function included in the terminal device 100a.

(8) The terminal device 100a may further include a storage unit that stores therein, for each of a plurality of times of checks made by the connection check unit 109a, a piece of connection information indicating whether the terminal device 100a has been connected to the network.

When a rate of pieces of connection information indicating that the terminal device 100a has been connected to the network among all of the pieces of connection information does not satisfy a predetermined condition, the invalidation unit 115a invalidates the function included in the terminal device 100a.

(9) The terminal device 100a may further include an acquisition unit configured to acquire permission information indicating whether to exempt the terminal device 100a from function invalidation.

When the acquired permission information does not indicate to exempt the terminal device 100a from function invalidation, the invalidation unit 115a invalidates the function included in the terminal device 100a.

(10) The terminal device 100a may be a computer system that includes a memory unit that stores therein a control program and a processor that executes the control program.

The terminal device 100a may further include: an acquisition unit configured to acquire permission information; a playback unit configured to play back a message; and a reception unit configured to receive an operation instruction from a user.

The acquired permission information includes an update program for updating the control program, and indicates to exempt the terminal device 100a from function invalidation on condition that the control program is updated with use of the update program.

When the connection check unit 109a judges that the terminal device 100a is not connected to the network, the playback unit plays back the message for inquiring of the user as to whether to update the control program with use of the update program.

When the acquired permission information indicates to exempt the terminal device 100a from function invalidation, and the operation instruction indicates not to update the control program, the invalidation unit 115a invalidates the function included in the terminal device 100a.

2. Embodiment 2

The following describes a content transmission and reception system 10 as Embodiment 2 relating to the present invention with reference to the drawings.

2.1 Content Transmission and Reception System 10

The content transmission and reception system 10 includes a TV receiver 100 and a server device 200 as shown in FIG. 1. The TV receiver 100 and the server device 200 are connected to each other via a network 20 such as the Internet.

The server device 200 for example transmits a content composed of a video and an audio to the TV receiver 100 via the network 20. Also, the server device 200 transmits a control program to the TV receiver 100 via the network 20.

The control program is used in the TV receiver 100, and is a computer program composed of instructions instructing operations in the TV receiver 100. The server device 200 is for example provided in a service center of a manufacturer of the TV receiver 100.

Also, a program broadcast device (not illustrated) for example broadcasts a content composed of a video and an audio superimposed on a broadcast wave.

The TV receiver 100 is provided in a user's house. The TV receiver 100 obtains a content by receiving the content from the server device 200 via the network 20. Also, the TV receiver 100 obtains a content by receiving a broadcast wave and extracting the content from the broadcast wave. Next, the TV receiver 100 plays back the obtained content for output as a video and an audio.

Also, the TV receiver 100 includes a microprocessor and a memory that stores therein a control program. The TV receiver 100 achieves its function by the microprocessor operating in accordance with the computer program stored in the memory.

In order to add a function which has not been included in the TV receiver 100 in shipping, the TV receiver 100 receives a new control program from the server device 200, and additionally writes the received new control program into the memory. Since addition of functions after shipping is available in this way, it is possible to minimize the number of functions which need to be included in the TV receiver 100 in shipping.

Also, when any failure in the control program stored in the memory is detected, the TV receiver 100 receives a control program for solving the failure from the server device 200. Then, the TV receiver 100 updates an old control program stored in the memory with the received control program. As a result, the TV receiver 100 changes the control program via the network 20 to solve the failure of the TV receiver 100.

In this way, it is possible to easily add and update functions via the network 20 as long as the TV receiver 100 is connected to the server device 200 via the network 20. As a result, on the assumption that the TV receiver 100 is connected to the server device 200, there occurs a great change in a manufacturing method of the TV receiver 100 and a dealing method relating to maintenance of the TV receiver 100.

Also, the TV receiver 100 is connected to the server device 200 to supply data to the server device 200. Also, the server device 200 supplies data to the TV receiver 100. This increases a user's convenience.

2.2 Server Device 200

Figure 2:
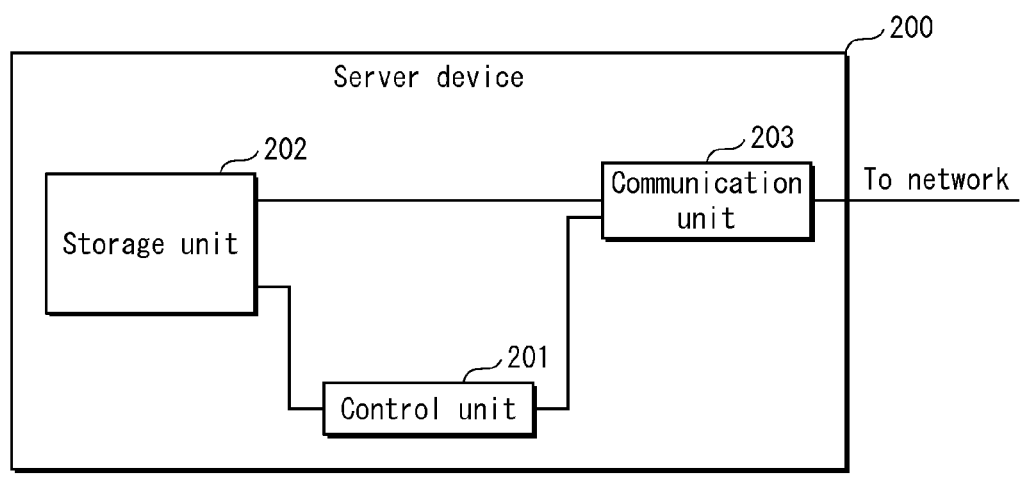
FIG. 2 is a block diagram showing a structure of a server device 200.

The server device 200 includes a control unit 201, a storage unit 202, and a communication unit 203 as shown in FIG. 2.

The server device 200 is specifically a computer system composed of a microprocessor, a ROM, a RAM, a hard disk device, and so on. The ROM or the hard disk device stores therein a control program that is a computer program. The control unit 201 and the communication unit 203 included in the server device 200 achieve respective functions by the microprocessor operating in accordance with the computer program.

(1) Storage Unit 202

The storage unit 202 stores therein a control program for update and a control program for addition. The control program for update and the control program for addition are each a computer program that is used in the TV receiver 100. The control program for update is used for updating the control program stored in the TV receiver 100. The control program for addition is used for adding a new function to the TV receiver 100.

Also, the storage unit 202 stores therein a content composed of a video and an audio. The content is transmitted to the TV receiver 100 via the network 20, and then is played back in the TV receiver 100.

(2) Control Unit 201

In response to a request from the TV receiver 100, the control unit 201 reads the control program or the content from the storage unit 202. Then, the control unit 201 transmits the read control program or content to the TV receiver 100 via the communication unit 203 and the network 20.

(3) Communication Unit 203

The communication unit 203 performs transmission and reception of data with the TV receiver 100 via the network 20.

2.3 TV Receiver 100

Figure 3:
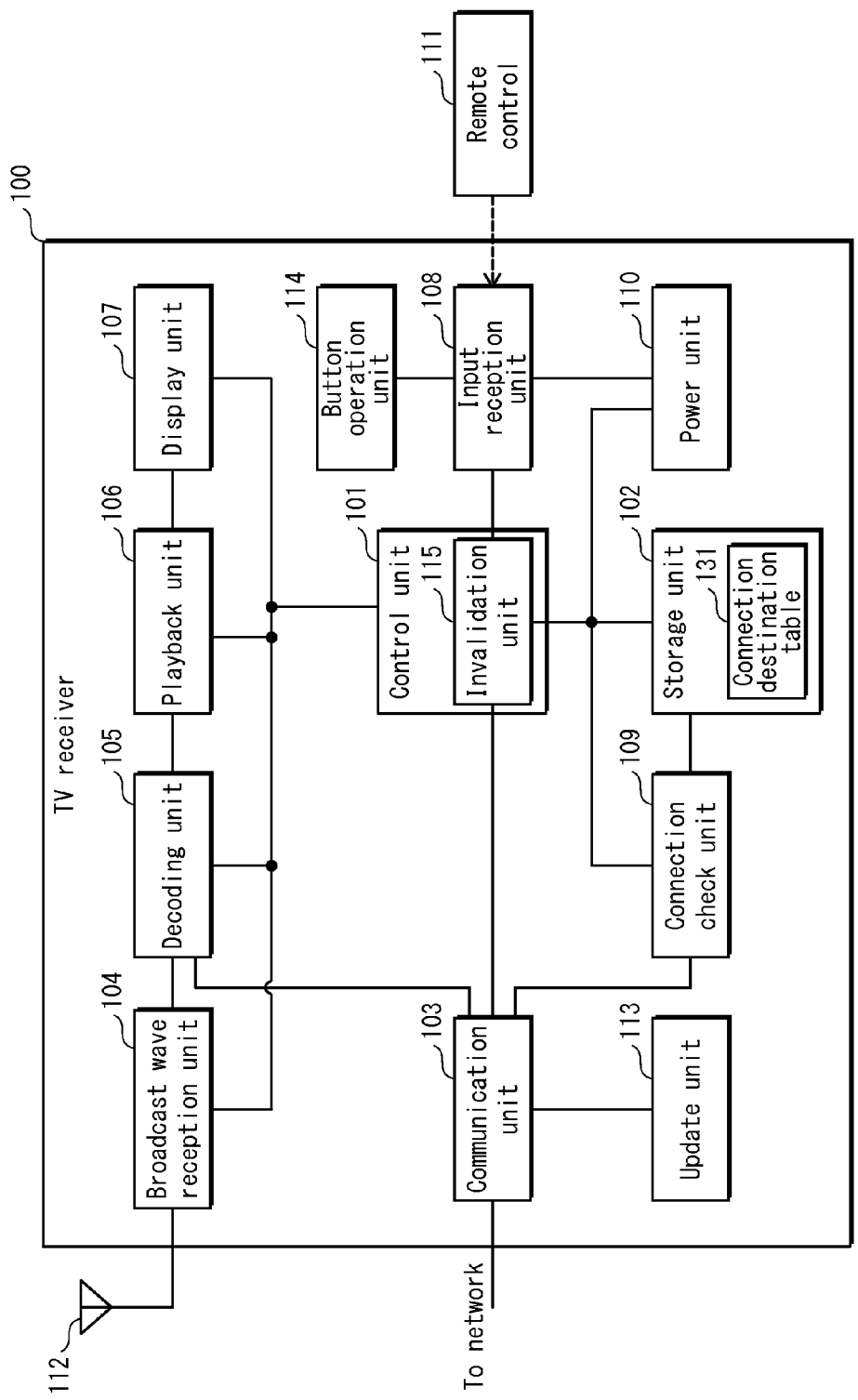
FIG. 3 is a block diagram showing a structure of a TV receiver 100.

The TV receiver 100 includes, as shown in FIG. 3, a control unit 101, a storage unit 102, a communication unit 103, a broadcast wave reception unit 104, a decoding unit 105, a playback unit 106, a display unit 107, an input reception unit 108, a connection check unit 109, a power unit 110, an update unit 113, and a button operation unit 114. An antenna 112 is connected to the broadcast wave reception unit 104. Also, the input reception unit 108 receives an operation signal resulting from an operation performed on a remote control 111 by the user.

The TV receiver 100 is specifically a computer system composed of a microprocessor, a ROM, a RAM, a hard disk device, and so on. The ROM or the hard disk device stores therein a control program that is a computer program. The control unit 101, the communication unit 103, the broadcast wave reception unit 104, the decoding unit 105, the playback unit 106, the input reception unit 108, the connection check unit 109, and the update unit 113, which are included in the TV receiver 100, achieve respective functions by the microprocessor operating in accordance with the computer program.

The functional blocks included in the TV receiver 100 such as the control unit 101, the storage unit 102, the communication unit 103, the broadcast wave reception unit 104, the decoding unit 105, the playback unit 106, the connection check unit 109, and the update unit 113 are each typically realized as an LSI that is an integrated circuit. Also, note that these functional blocks may be separately integrated into a single chip, or integrated into a single chip including part of at least one of the functional blocks or part of each of the functional blocks.

A method of circuit integration is not limited to an LSI, and may be realized by a dedicated circuit or a general processor. Furthermore, it may be possible to use an FPGA (Field Programmable Gate Array) programmable after manufacturing LSIs or a reconfigurable processor in which connection and setting of a circuit cell inside an LSI is reconfigurable after manufacturing LSIs.

Furthermore, when a new technology for forming integrated circuits that replaces LSIs becomes available as a result of progress in semiconductor technology or semiconductor-derived technologies, functional blocks may be integrated using such technology.

Also, the functional blocks each may be realized by software or a combination of an LSI and software. Furthermore, software may be tamper-resistant.

The TV receiver 100 is connected to the server device 200 via the network 20, and performs transmission and reception of data with the server device 200 via the network 20. Here, the data includes a content, a control program, data relating to the user, control data for controlling the TV receiver 100, and so on.

(1) Button Operation Unit 114 and Remote Control 111

The button operation unit 114 has various types of buttons such as a power button. When any of these buttons is operated by the user, the button operation unit 114 outputs an operation signal corresponding to the operated button to the input reception unit 108.

The remote control 111 has various types of buttons such as a power button. When any of these buttons is operated by the user, the remote control 111 outputs an operation signal corresponding to the button to the input reception unit 108.

(2) Power Unit 110

While powered off, the TV receiver 100 is in one of two types of power-off mode including a standby mode and a complete off mode. In the complete off mode, no electrical power is supplied to any of the structural elements of the TV receiver 100. In the standby mode, electrical power is supplied only to the input reception unit 108, and no electrical power is supplied to other structural elements.

When the TV receiver 100 in the complete off mode is powered on by the user with the power button of the button operation unit 114, the power unit 110 supplies electrical power only to the input reception unit 108, the control unit 101, the storage unit 102, the communication unit 103, and the connection check unit 109. When the TV receiver 100 in the standby mode is powered on by the user with the power button of the remote control 111, the power unit 110 supplies electrical power to the control unit 101, the storage unit 102, the communication unit 103, and the connection check unit 109, in addition to the input reception unit 108 to which electrical power has already been supplied.

When the TV receiver 100 is powered off by the user with the power button of the TV receiver 100, the TV receiver 100 switches to the complete off mode. Here, the power unit 110 suspends supply of electrical power to all of the structural elements of the TV receiver 100 under control of the control unit 101. On the other hand, when the TV receiver 100 is powered off by the user with the power button of the remote control 111, the TV receiver 100 switches to the standby mode. Here, the power unit 110, under control of the control unit 101, supplies electrical power only to the input reception unit 108, and suspends supply of electrical power to other structural elements of the TV receiver 108.

Furthermore, as described later, in the power-on mode, when the connection check unit 109 judges that the TV receiver 100 is connected to the network 20, the power unit 110, under control of the control unit 101, supplies electrical power to the broadcast wave reception unit 104, the decoding unit 105, the playback unit 106, the display unit 107, and the update unit 113.

Furthermore, as described later, in the power-on mode, when the connection check unit 109 judges that the TV receiver 100 is not connected to the network 20, the power unit 110, under control of the invalidation unit 115 included in the control unit 101, suspends supply of electrical power to the control unit 101, the input reception unit 108, the communication unit 103, the connection check unit 109, and the storage unit 102. That is, irrespective of the user's operation, the power unit 110, under control of the control unit 101, forcibly powers off the TV receiver 100.

(3) Storage Unit 102

The storage unit 102 is composed of a hard disk device and/or a non-volatile semiconductor memory.

The storage unit 102 for example stores therein a connection destination table 131, a content composed of a video and an audio, data relating to the user, a control program for controlling the operations of the TV receiver 100, control data for controlling the TV receiver 100, and other data.

Figure 4:
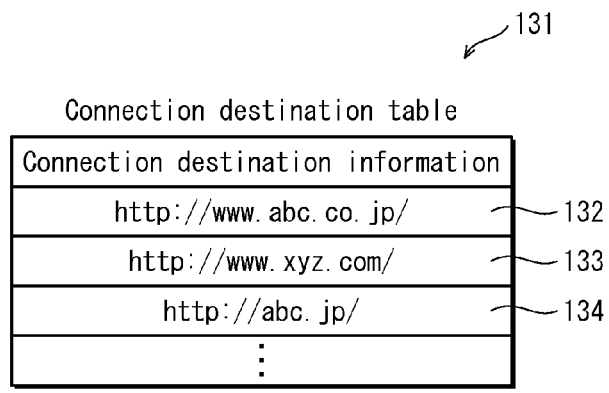
FIG. 4 shows an example of a data structure of a connection destination table 131.

The connection destination table 131 for example includes a plurality of pieces of connection destination information 132, 133, 134, . . . , as shown in FIG. 4. The pieces of connection destination information are each a URL (Uniform Resource Locator) indicating a location of a web site on the network 20. The pieces of connection destination information are used for checking whether the TV receiver 100 is connected to the network 20.

The connection destination information 132 for example indicates a location of the server device 200 on the network 20. The connection destination information 133 for example indicates a location of a check device on the network 20. The check device is used only for checking whether the TV receiver 100 is connected to the network 20. The connection destination information 134 for example indicates a location of another server device on the network 20. The other server device is a web site for the manufacturer of the TV receiver 100 to provide users with information.

(4) Input Reception Unit 108

The input reception unit 108 receives an operation signal for operating the TV receiver 100 from the remote control 111 or the button operation unit 114 through a user's operation. When the user presses the power-on button of the remote control 111 for example, the input reception unit 108 receives an operation signal indicating power-on from the remote control 111, and outputs the received operation signal to the control unit 101.

(5) Antenna 112, Broadcast Wave Reception Unit 104, Decoding Unit 105, Playback Unit 106, and Display Unit 107

The antenna 112 receives a broadcast wave.

The broadcast wave reception unit 104 receives the broadcast wave from the antenna 112, selects a broadcast stream from the broadcast wave, and demodulates the selected broadcast stream.

The decoding unit 105 receives the broadcast stream from the broadcast wave reception unit 104. Also, the decoding unit 105 receives the broadcast stream from the communication unit 103. Next, the decoding unit 105 separates the received broadcast stream to generate a video stream and an audio stream. Next, the decoding unit 105 decodes the video stream and the audio stream to generate a digital video signal and a digital audio signal, respectively.

The playback unit 106 generates an analog video signal and an analog audio signal from the digital video signal and the digital audio signal, respectively. Also, the playback unit 106, under control of the control unit 101, generates an analog video signal from other videos, still images, messages, and so on.

The display unit 107 includes a liquid crystal display device and a speaker. The display unit 107 receives the analog video signal and the analog audio signal from the playback unit 106 to output a video and an audio.

(6) Communication Unit 103

The communication unit 103 is connected to the server device 200 via the network 20, and performs transmission and reception of data with the server device 200 via the network 20.

(7) Connection Check Unit 109

The connection check unit 109 reads one piece of connection destination information from the connection destination table 131 stored in the storage unit 102. Then, the connection check unit 109 tries to connect to a web site indicated by the read piece of connection destination information via the communication unit 103. When receiving an ACK (Acknowledgement) from the web site, the connection check unit 109 judges that the TV receiver 100 is connected to the network 20. When not receiving an ACK from the web site for a certain time period or more, for example for five seconds or more, the connection check unit 109 judges that the TV receiver 100 is not connected to the network 20.

Then, when judging that the TV receiver 100 is not connected to the network 20, the connection check unit 109 outputs non-connected state information to the control unit 101. Here, the non-connected state information indicates that the TV receiver 100 is not connected to the network 20. When judging that the TV receiver 100 is connected to the network 20, the connection check unit 109 outputs connected state information to the control unit 101. Here, the connected state information indicates that the TV receiver 100 is connected to the network 20.

Note that the connection check unit 109 may judge whether the TV receiver 100 is connected to the network 20 in the following manner.

The connection check unit 109 reads all the pieces of connection destination information from the connection destination table 131 stored in the storage unit 102. Then, the connection check unit 109 tries to connect to a web site indicated by each of the read pieces of connection destination information via the communication unit 103. When receiving an ACK form a web site indicated by at least one of the pieces of connection destination information, the connection check unit 109 judges that the TV receiver 100 is connected to the network 20. When not receiving an ACK from any of web sites indicated by all the pieces of connection destination information for a certain time period or more, the connection check unit 109 judges that the TV receiver 100 is not connected to the network 20.

(8) Update Unit 113

The update unit 113 receives a control program for update or a control program for addition from the server device 200 via the network 20 and the communication unit 103.

When receiving a control program for update, the update unit 113 updates an original control program stored in the storage unit 102 with the received control program for update. Also, when receiving a control program for addition, the update unit 113 additionally writes the received control program for addition into the storage unit 102.

(9) Control Unit 101

The control unit 101 achieves the functions of the TV receiver 100 by controlling the storage unit 102, the communication unit 103, the broadcast wave reception unit 104, the decoding unit 105, the playback unit 106, the display unit 107, the input reception unit 108, the connection check unit 109, the power unit 110, and the update unit 113.

The control unit 101 includes an invalidation unit 115.

The control unit 101 receives an operation signal from the remote control 111 via the input reception unit 108. Upon receiving the operation signal, the control unit 101 performs control in accordance with the received operation signal.

When receiving an operation signal indicating power-off by the power button of the TV receiver 100, the control unit 101 controls the power unit 110 to suspend supply of electrical power to all of the structural elements of the TV receiver 100. When receiving an operation signal indicating power-off by the power button of the remote control 111, the control unit 101 controls the power unit 110 to suspend supply of electrical power to all of the structural elements of the TV receiver 100 except the input reception unit 108.

The control unit 101 receives non-connected state information or connected state information from the connection check unit 109. When receiving the non-connected state information, the invalidation unit 115 included in the control unit 101 controls the power unit 110 to forcibly suspend supply of electrical power to the communication unit 103, the connection check unit 109, the storage unit 102, the control unit 101, and the input reception unit 108.

When receiving the connected state information on the other hand, the control unit 101 controls the power unit 110 to supply electrical power to the broadcast wave reception unit 104, the decoding unit 105, the playback unit 106, the display unit 107, and the update unit 113. Also, the control unit 101 controls the broadcast wave reception unit 104 to select and demodulate a broadcast stream from a broadcast wave. The control unit 101 controls the decoding unit 105 to separate the received broadcast stream to generate a video stream and an audio stream. Furthermore, the control unit 101 controls the decoding unit 105 to decode the video stream and the audio stream to generate a digital video signal and a digital audio signal, respectively. The control unit 101 controls the display unit 107 to display a video of a broadcast program and output an audio of the broadcast program.

2.4 Operations in Case where TV Receiver 100 is Powered on

Figure 5:
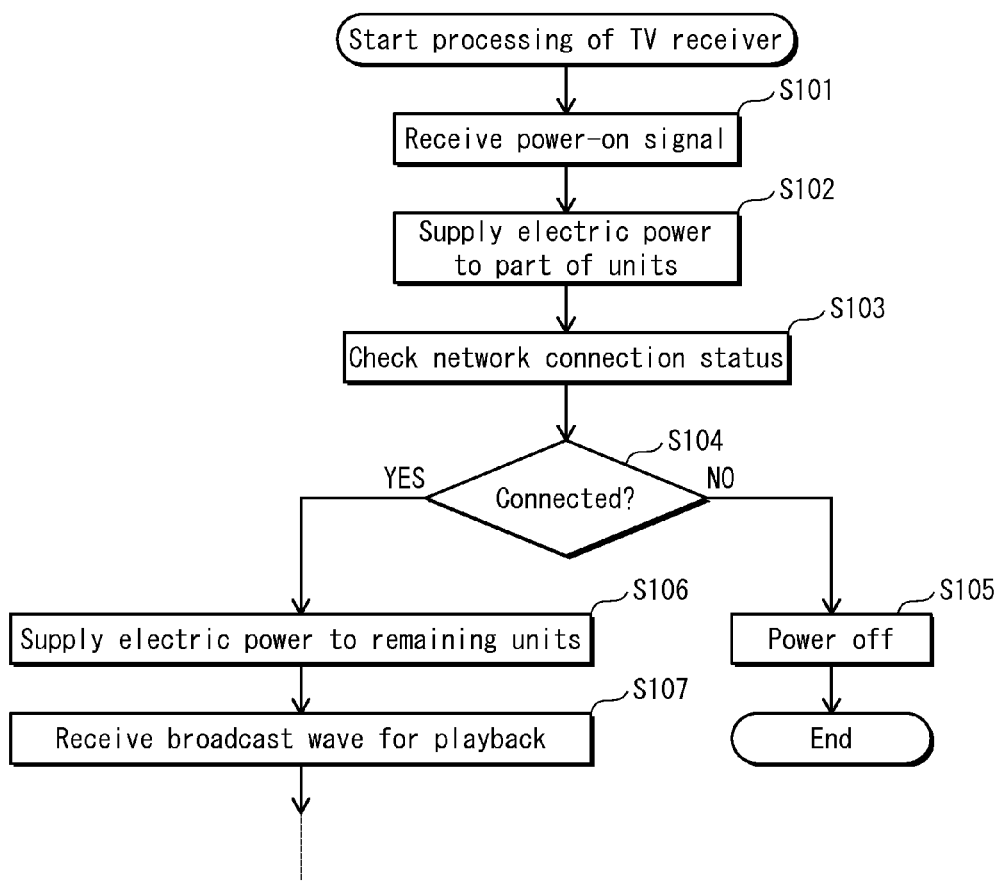
FIG. 5 is a flow chart showing operations of the TV receiver 100.

The following describes operations of the TV receiver 100 in the standby mode in the case where the TV receiver 100 is powered on through the user's operation performed on the remote control 111, with reference to a flow chart shown in FIG. 5.

The input reception unit 108 receives an operation signal indicating power-on from the remote control 111 (Step S101). Next, the power unit 110 supplies electrical power to the control unit 101, the storage unit 102, the communication unit 103, and the connection check unit 109 (Step S102).

The connection check unit 109 tries to connect to a web site indicated by connection destination information included in the connection destination table 131 stored in the storage unit 102 via the communication unit 103. Through this operation, the connection check unit 109 checks whether the TV receiver 100 is connected to the network 20 (Step S103). When the connection check unit 109 judges that the TV receiver 100 is connected to the network 20 (Step S104: YES), the power unit 110, under control of the control unit 101, supplies electrical power to the broadcast wave reception unit 104, the decoding unit 105, the playback unit 106, the display unit 107, and the update unit 113 (Step S106). The broadcast wave reception unit 104 selects a broadcast stream from the broadcast wave, and demodulates the selected broadcast stream. The decoding unit 105 separates the broadcast stream to generate a video stream and an audio stream. Next, the decoding unit 105 decodes the video stream and the audio stream to generate a digital video signal and a digital audio signal, respectively. The playback unit 106 generates an analog video signal and an analog audio signal. The display unit 107 displays a video of a broadcast program and outputs an audio of the broadcast program (Step S107).

When the connection check unit 109 judges that the TV receiver 100 is not connected to the network 20 on the other hand (Step S104: NO), the power unit 110, under control of the invalidation unit 115 included in the control unit 101, forcibly suspends supply of electrical power to the input reception unit 108, the communication unit 103, the connection check unit 109, the storage unit 102, and the control unit 101. In other words, the power unit 110 switches the TV receiver 100 to the complete off mode (Step S105). This completes the operations of the TV receiver 100.

2.5 Conclusion

As described above, the TV receiver 100 included in the content transmission and reception system 10 checks, through a user's operation, whether the TV receiver 100 is connected to the network 20 immediately after power-on. When the connection check unit 109 judges that the TV receiver 100 is not connected to the network 20, the power unit 110 forcibly powers off the TV receiver 100.

For this reason, the user cannot use the TV receiver 100 unless the TV receiver 100 is connected to the network. As a result, the TV receiver 100 can force the user to connect to the network.

Since it is possible to force the user to connect the TV receiver 100 to the network, addition of a new function and solving of a failure can be realized. This results in increase in user's convenience. Furthermore, since addition of functions via the network is expected, it is possible to minimize the number of functions (control programs) which need to be included in the TV receiver 100 in shipping. This results in size reduction of the memory for storing programs in the TV receiver 100.

3. Other Modifications

Although the present invention has been described based on the above embodiments, the present invention is not limited to the above embodiments. The present invention may be realized as described below.

3.1 Modification (1)

The following describes a TV receiver 100 as Modification (1) of the above embodiments.

In the above embodiments, a broadcast wave is not received until a check is made as to whether the TV receiver 100 is connected to the network 20. In Modification (1) compared with this, a broadcast wave is received to play back a broadcast program in a time period in which a check is made as to the connection status of the TV receiver 100 to the network 20. Modification (1) differs in this point from the above embodiments.

The following mainly describes different points between Modification (1) and the above embodiments.

When the TV receiver 100 in the complete off mode is powered on by the user with the power button of the button operation unit 114, the power unit 110 supplies electrical power to all of the structural elements of the TV receiver 100. When the TV receiver 100 in the standby mode is powered on by the user with the power button of the remote control 111, the power unit 110 supplies electrical power to all of the remaining structural elements, in addition to the input reception unit 108 to which electrical power has already been supplied.

When the TV receiver 100 is powered on, the connection check unit 109 judges whether the TV receiver 100 is connected to the network 20. During the check, the broadcast wave reception unit 104 selects a broadcast stream from the broadcast wave, and demodulates the selected broadcast stream, and the decoding unit 105 decodes a video stream and an audio stream. The playback unit 106 generates an analog video signal and an analog audio signal, and the display unit 107 displays a video of a broadcast program and outputs an audio of the broadcast program.

When the connection check unit 109 judges that the TV receiver 100 is connected to the network 20, the broadcast wave reception unit 104, the decoding unit 105, the playback unit 106, and the display unit 107 continue to reception and demodulation, decoding, playback, and display and output with respect to the broadcast wave, respectively.

When the connection check unit 109 judges that the TV receiver 100 is not connected to the network 20, the power unit 110 suspends supply of electrical power to all of the structural elements of the TV receiver 100.

Figure 6:
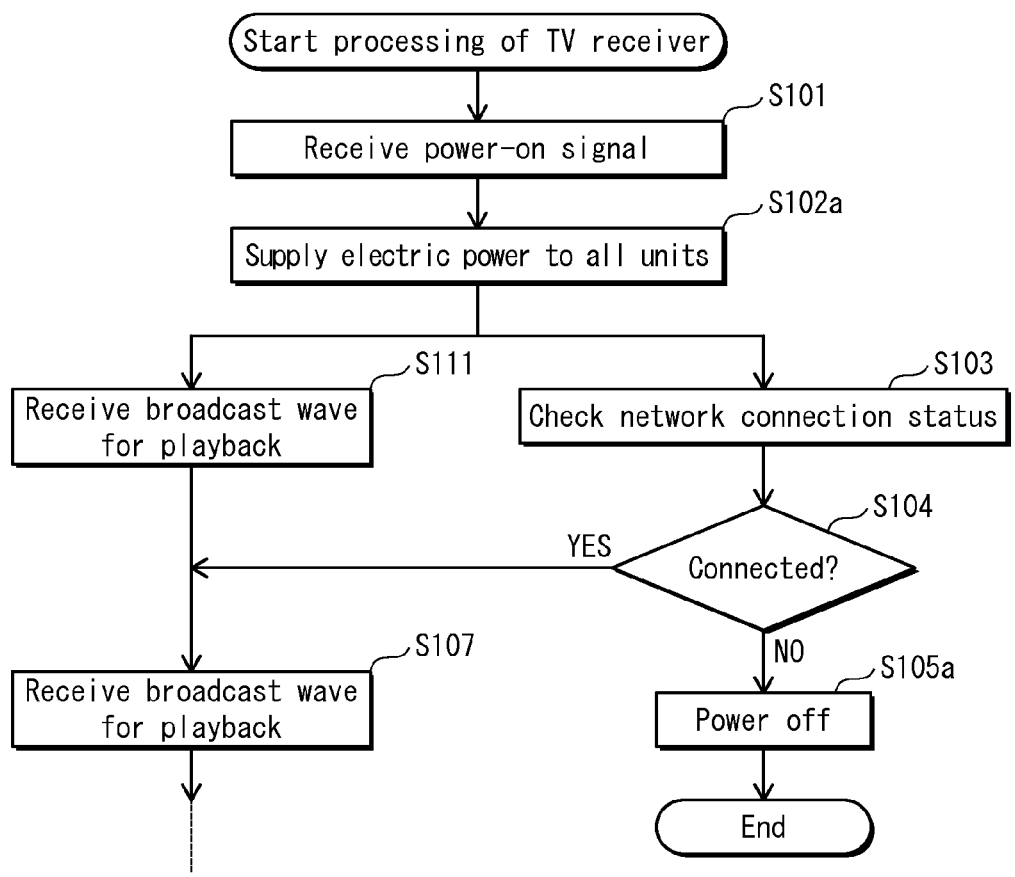
FIG. 6 is a flow chart showing operations of a TV receiver 100 as Modification (1).

The following describes operations of the TV receiver 100 in the standby mode in the case where the TV receiver 100 is powered on through the user's operation performed on the remote control 111, with reference to a flow chart shown in FIG. 6.

The input reception unit 108 receives an operation signal indicating power-on from the remote control 111 (Step S101). Then, the power unit 110 supplies electrical power to all of the structural elements of the TV receiver 100 except the input reception unit 108 (Step S102a).

When supply of electrical power is commenced, the connection check unit 109 checks whether the TV receiver 100 is connected to the network 20 (Step S103).

When supply of electrical power is commenced, the following processing is performed in a time period in which the operations of Step S103 are performed. The broadcast wave reception unit 104 selects a broadcast stream from the broadcast wave, and demodulates the selected broadcast stream. The decoding unit 105 separates the broadcast stream to generate a video stream and an audio stream. Next, the decoding unit 105 decodes the video stream and the audio stream to generate a digital video signal and a digital audio signal, respectively. The playback unit 106 generates an analog video signal and an analog audio signal. The display unit 107 displays a video of a broadcast program and outputs an audio of the broadcast program (Step S111).

When the connection check unit 109 judges that the TV receiver 100 is connected to the network 20 (Step S104: YES), the broadcast wave reception unit 104 continues to select a broadcast stream from the broadcast wave, and demodulate the selected broadcast stream. The decoding unit 105 continues to separate the broadcast stream to generate a video stream and an audio stream. Next, the decoding unit 105 continues to decode the video stream and the audio stream to generate a digital video signal and a digital audio signal, respectively. The playback unit 106 continues to generate an analog video signal and an analog audio signal. The display unit 107 continues to display a video of a broadcast program and outputs an audio of the broadcast program (Step S107).

When the connection check unit 109 judges that the TV receiver 100 is not connected to the network 20 on the other hand (Step S104: NO), the power unit 110, under control of the invalidation unit 115 included in the control unit 101, suspends supply of electrical power to all of the structural elements of the TV receiver 100. In other words, the power unit 110 switches the TV receiver 100 to the complete off mode (Step S105a). This completes the operations of the TV receiver 100.

3.2 Modification (2)

The following describes a TV receiver 100 as Modification (2) of the above embodiments.

In the above embodiments, when the connection check unit 109 judges that the TV receiver 100 is not connected to the network 20, the power unit 110 immediately powers off the TV receiver 100. In Modification (2) compared with this, when the connection check unit 109 judges that the TV receiver 100 is not connected to the network 20, the display unit 107 displays a special video, and then the power unit 110 powers off the TV receiver 100. Modification (2) differs in this point from the above embodiments.

The following mainly describes different points between Modification (2) and the above embodiments.

In shipping of the TV receiver 100, the storage unit 102 further stores therein a special video such as a promotional video for promoting users to make network connection.

When the TV receiver 100 in the complete off mode is powered on by the user with the power button of the button operation unit 114, the power unit 110 supplies electrical power to the input reception unit 108, the control unit 101, the storage unit 102, the communication unit 103, the connection check unit 109, the decoding unit 105, the playback unit 106, and the display unit 107. When the TV receiver 100 in the standby mode is powered on by the user with the power button of the remote control 111, the power unit 110 supplies electrical power to the control unit 101, the storage unit 102, the communication unit 103, the connection check unit 109, the decoding unit 105, the playback unit 106, and the display unit 107, in addition to the input reception unit 108 to which electrical power has already been supplied.

When the connection check unit 109 judges that the TV receiver 100 is not connected to the network 20, the decoding unit 105, under control of the power unit 110, reads the special video from the storage unit 102. Next, the decoding unit 105 decodes the read special video to generate a digital video signal. The playback unit 106 generates an analog video signal from the digital video signal. The display unit 107 displays a video based on the analog video signal.

Figure 7:
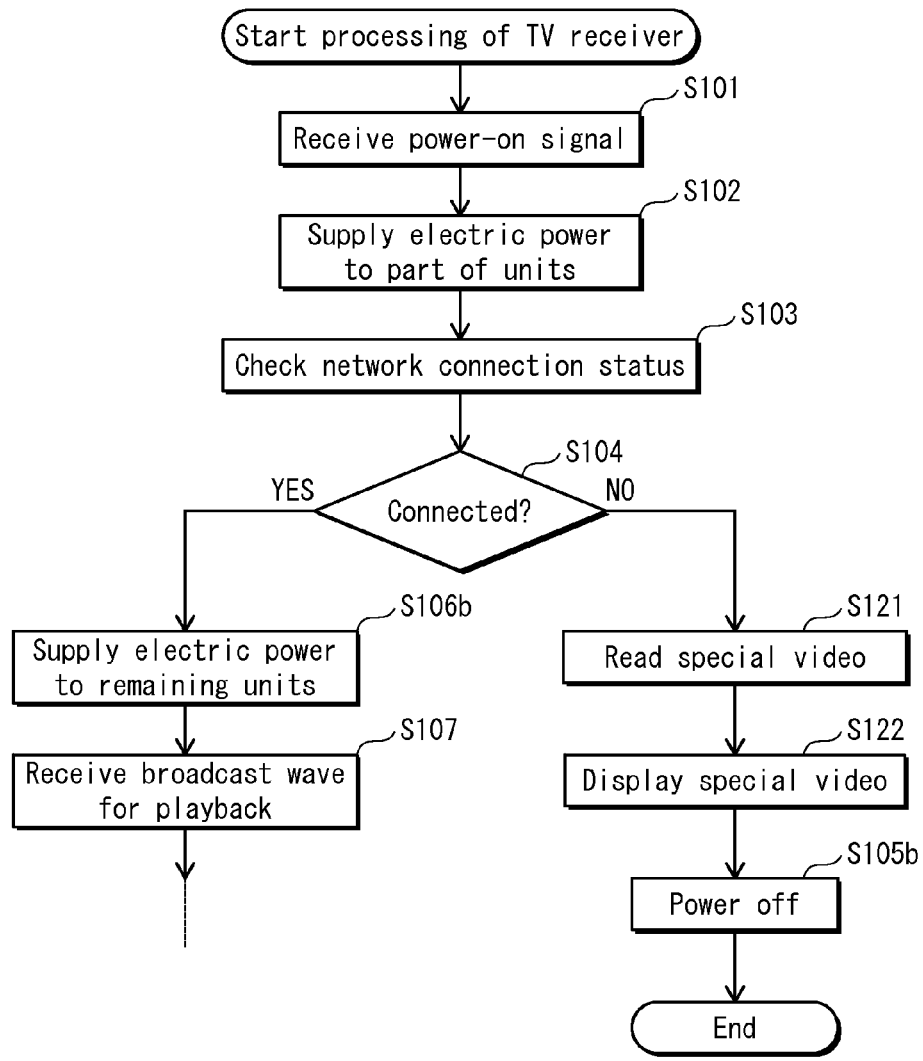
FIG. 7 is a flow chart showing operations of a TV receiver 100 as Modification (2).

The following describes operations of the TV receiver 100 in the standby mode in the case where TV receiver 100 is powered on through the user's operation performed on the remote control 111, with reference to a flow chart shown in FIG. 7.

The input reception unit 108 receives an operation signal indicating power-on from the remote control 111 (Step S101). Next, the power unit 110 supplies electrical power to the control unit 101, the storage unit 102, the communication unit 103, the connection check unit 109, the decoding unit 105, the playback unit 106, and the display unit 107 (Step S102b).

The connection check unit 109 checks whether the TV receiver 100 is connected to the network 20 (Step S103). When the connection check unit 109 judges that the TV receiver 100 is connected to the network 20 (Step S104: YES), the power unit 110, under control of the control unit 101, supplies electrical power to the broadcast wave reception unit 104 and the update unit 113 (Step S106b). The broadcast wave reception unit 104 selects a broadcast stream from the broadcast wave, and demodulates the selected broadcast stream. The decoding unit 105 separates the broadcast stream to generate a video stream and an audio stream. Next, the decoding unit 105 decodes the video stream and the audio stream to generate a digital video signal and a digital audio signal, respectively. The playback unit 106 generates an analog video signal and an analog audio signal. The display unit 107 displays a video of a broadcast program and outputs an audio of the broadcast program (Step S107).

When the connection check unit 109 judges that the TV receiver 100 is not connected to the network 20 on the other hand (Step S104: NO), the decoding unit 105, under control of the control unit 101, reads the special video from the storage unit 102 (Step S121). Next, the decoding unit 105 decodes the read special video to generate a digital video signal. The playback unit 106 generates an analog video signal from the digital video signal. The display unit 107 displays a video based on the analog video signal (Step S122). Next, the power unit 110, under control of the invalidation unit 115 included in the control unit 101, forcibly suspends supply of electrical power to the input reception unit 108, the communication unit 103, the connection check unit 109, the storage unit 102, the control unit 101, the decoding unit 105, the playback unit 106, and the display unit 107. In other words, the power unit 110 switches the TV receiver 100 to the complete off mode (Step S105b). This completes the operations of the TV receiver 100.

3.3 Modification (3)

The following describes a TV receiver 100 as Modification (3) of the above embodiments.

In the above embodiments, when the connection check unit 109 judges that the TV receiver 100 is not connected to the network 20, the power unit 110 immediately powers off the TV receiver 100. In Modification (3) compared with this, when the connection check unit 109 judges that the TV receiver 100 is not connected to the network 20, the TV receiver 100 displays a warning text, and then powers off the TV receiver 100. Modification (3) differs in this point from the above embodiments.

The following mainly describes different points between Modification (3) and the above embodiments.

In shipping of the TV receiver 100, the storage unit 102 further stores therein, as text data, a warning text for warning users to make network connection. Note that the storage unit 102 may store therein a warning image representing warning text for warning users to make network connection.

FIG. 8 shows an example of the warning text. A warning text 141 shown in FIG. 8 notifies a user of that the TV receiver is not connected to a network, and promotes the user to connect to the network.

When the TV receiver 100 in the complete off mode is powered on by the user with the power button of the button operation unit 114, the power unit 110 supplies electrical power to the input reception unit 108, the control unit 101, the storage unit 102, the communication unit 103, the connection check unit 109, the playback unit 106, and the display unit 107. When the TV receiver 100 in the standby mode is powered on by the user with the power button of the remote control 111, the power unit 110 supplies electrical power to the control unit 101, the storage unit 102, the communication unit 103, the connection check unit 109, the playback unit 106, and the display unit 107, in addition to the input reception unit 108 to which electrical power has already been supplied.

When the connection check unit 109 judges that the TV receiver 100 is not connected to the network 20, the playback unit 106, under control of the control unit 101, reads the warning text from the storage unit 102. Next, the playback unit 106 generates a digital video signal based on the read warning text. The playback unit 106 generates an analog video signal from the digital video signal. The display unit 107 displays a video based on the analog video signal.

The following describes operations of the TV receiver 100 in the standby mode in the case where the TV receiver 100 is powered on through the user's operation performed on the remote control 111, with reference to a flow chart shown in FIG. 9.

The input reception unit 108 receives an operation signal indicating power-on from the remote control 111 (Step S101). Next, the power unit 110 supplies electrical power to the control unit 101, the storage unit 102, the communication unit 103, the connection check unit 109, the playback unit 106, and the display unit 107 (Step S102c).

The connection check unit 109 checks whether the TV receiver 100 is connected to the network 20 (Step S103). When the connection check unit 109 judges that the TV receiver 100 is connected to the network 20 (Step S104: YES), the power unit 110, under control of the control unit 101, supplies electrical power to the broadcast wave reception unit 104, the decoding unit 105, and the update unit 113 (Step S106c). The broadcast wave reception unit 104 selects a broadcast stream from the broadcast wave, and demodulates the selected broadcast stream. The decoding unit 105 separates the broadcast stream to generate a video stream and an audio stream. Next, the decoding unit 105 decodes the video stream and the audio stream to generate a digital video signal and a digital audio signal, respectively. The playback unit 106 generates an analog video signal and an analog audio signal. The display unit 107 displays a video of a broadcast program and outputs an audio of the broadcast program (Step S107).

When the connection check unit 109 judges that the TV receiver 100 is not connected to the network 20 on the other hand (Step S104: NO), the playback unit 106, under control of the control unit 101, reads the warning text from the storage unit 102 (Step S121a). Next, the playback unit 106 generates an analog video signal based on the read warning text. The display unit 107 displays a video based on the analog video signal (Step S122a). Next, the power unit 110, under control of the invalidation unit 115 included in the control unit 101, forcibly suspends supply of electrical power to the input reception unit 108, the communication unit 103, the connection check unit 109, the storage unit 102, the control unit 101, the playback unit 106, and the display unit 107. In other words, the power unit 110 switches the TV receiver 100 to the complete off mode (Step S105c). This completes the operations of the TV receiver 100.

3.4 Modification (4)

The following describes a TV receiver 100 as Modification (4) of the above embodiments.

In the above embodiments, when the connection check unit 109 judges that the TV receiver 100 is not connected to the network 20, the power unit 110 immediately powers off the TV receiver 100. In Modification (4) compared with this, when the connection check unit 109 judges that the TV receiver 100 is not connected to the network, the TV receiver 100 displays a warning text to promote to make settings for network connection. Then, when the user does not make settings for network connection, the power unit 110 powers off the TV receiver 100. Modification (4) differs in this point from the above embodiments.

The following mainly describes different points between Modification (4) and the above embodiments.

In shipping of the TV receiver 100, the storage unit 102 further stores therein, as text data, a warning text for warning users to make network connection. Note that the storage unit 102 may store therein a warning image representing warning text for warning users so as to make network connection.

FIG. 10 shows an example of the warning text. A warning text 151 shown in FIG. 10 notifies a user of that the TV receiver is not connected to a network, and inquires of the user as to whether to make settings for network connection.

When the TV receiver 100 in the complete off mode is powered on by the user with the power button of the button operation unit 114, the power unit 110 supplies electrical power to the input reception unit 108, the control unit 101, the storage unit 102, the communication unit 103, the connection check unit 109, the playback unit 106, and the display unit 107. When the TV receiver 100 in the standby mode is powered on by the user with the power button of the remote control 111, the power unit 110 supplies electrical power to the control unit 101, the storage unit 102, the communication unit 103, the connection check unit 109, the playback unit 106, and the display unit 107, in addition to the input reception unit 108 to which electrical power has already been supplied.

When the connection check unit 109 judges that the TV receiver 100 is not connected to the network 20, the playback unit 106, under control of the control unit 101, reads the warning text from the storage unit 102. Next, the playback unit 106 generates a digital video signal based on the read warning text. The playback unit 106 generates an analog video signal from the digital video signal. The display unit 107 displays a video based on the analog video signal. The displayed video notifies a user of that the TV receiver 100 is not connected to the network 20, and inquires of the user as to whether to make settings for network connection.

The control unit 101 receives a user's operation signal from the input reception unit 108. The operation signal indicates to make settings for network connection or not to make settings for network connection.

When the operational signal indicates not to make settings for network connection, the power unit 110, under control of the control unit 101, forcibly suspends supply of electrical power to the input reception unit 108, the communication unit 103, the connection check unit 109, the storage unit 102, the control unit 101, the playback unit 106, and the display unit 107.

When the operational signal indicates to make settings for network connection, the control unit 101 controls the playback unit 106 and the display unit 107 to display the network connection settings screen. Next, the control unit 101 receives a user's operation signal from the input reception unit 108. The operation signal indicates the details of the settings for network connection.

Next, the control unit 101 controls the connection check unit 109 to again check the network connection status.

Figure 11:
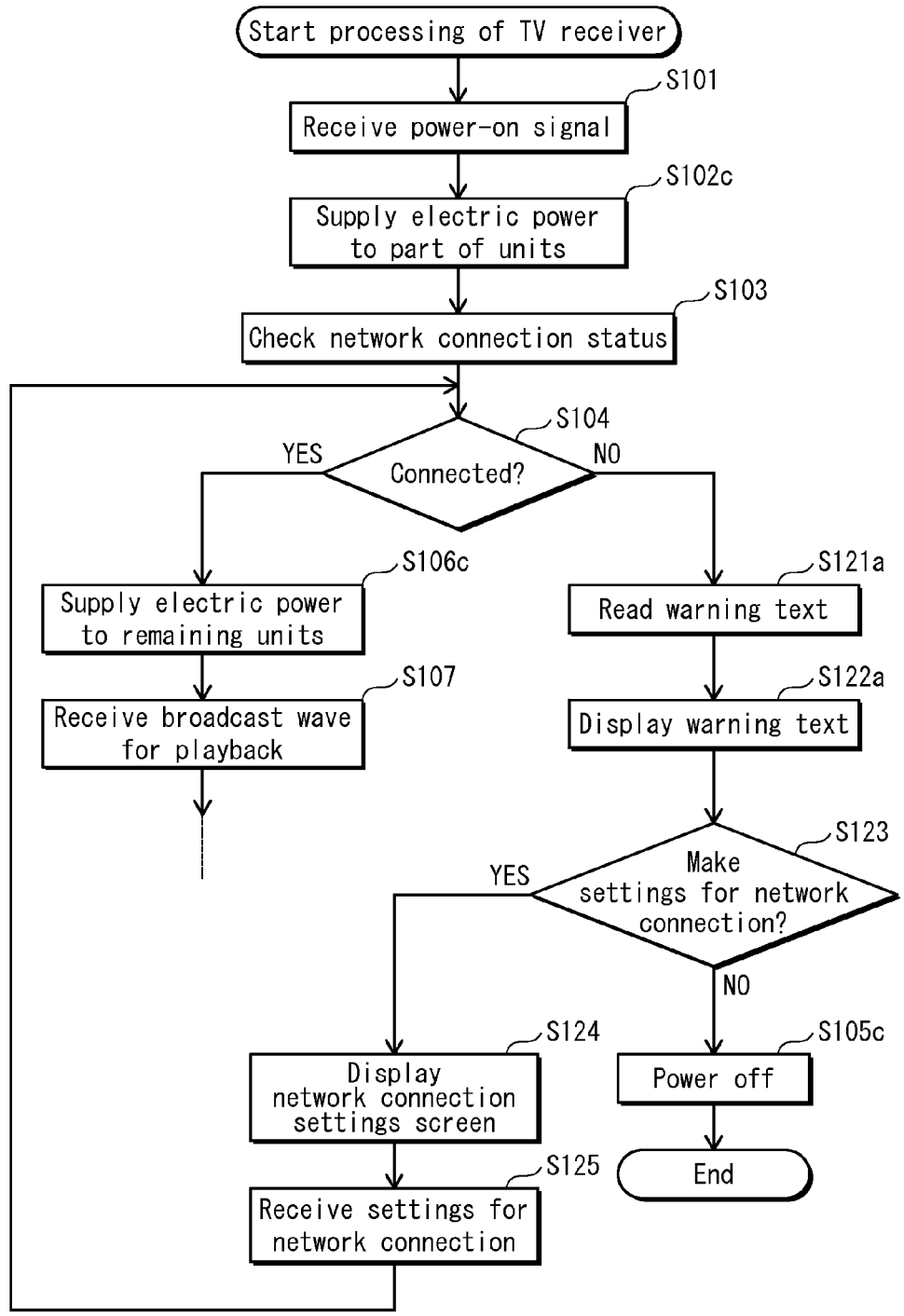
FIG. 11 is a flow chart showing operations of the TV receiver 100 as Modification (4).

The following describes operations of the TV receiver 100 in the standby mode in the case where the TV receiver 100 is powered on through the user's operation performed on the remote control 111, with reference to a flow chart shown in FIG. 11.

The input reception unit 108 receives an operation signal indicating power-on from the remote control 111 (Step S101). Next, the power unit 110 supplies electrical power to the control unit 101, the storage unit 102, the communication unit 103, the connection check unit 109, the playback unit 106, and the display unit 107 (Step S102c).

The connection check unit 109 checks whether the TV receiver 100 is connected to the network 20 (Step S103). When the connection check unit 109 judges that the TV receiver 100 is connected to the network 20 (Step S104: YES), the power unit 110, under control of the control unit 101, supplies electrical power to the broadcast wave reception unit 104, the decoding unit 105, and the update unit 113 (Step S106c). The broadcast wave reception unit 104 selects a broadcast stream from the broadcast wave, and demodulates the selected broadcast stream. The decoding unit 105 separates the broadcast stream to generate a video stream and an audio stream. Next, the decoding unit 105 decodes the video stream and the audio stream to generate a digital video signal and a digital audio signal, respectively. The playback unit 106 generates an analog video signal and an analog audio signal. The display unit 107 displays a video of a broadcast program and outputs an audio of the broadcast program (Step S107).

When the connection check unit 109 judges that the TV receiver 100 is not connected to the network 20 on the other hand (Step S104: NO), the playback unit 106, under control of the control unit 101, reads the warning text from the storage unit 102 (Step S121a). Next, the playback unit 106 generates an analog video signal based on the read warning text. The display unit 107 displays a video based on the analog video signal (Step S122a). The control unit 101 receives an operation signal indicating whether to make settings for network connection from the input reception unit 108 through the user's operation performed on the remote control 111. When the control unit 101 receives the operation signal indicating to make settings for network connection (Step S123: NO), the power unit 110, under control of the invalidation unit 115 included in the control unit 101, forcibly suspends supply of electrical power to the input reception unit 108, the communication unit 103, the connection check unit 109, the storage unit 102, the control unit 101, the playback unit 106, and the display unit 107. In other words, the power unit 110 switches the TV receiver 100 to the complete off mode (Step S105c). This completes the operations of the TV receiver 100.

When receiving the operation signal indicating to make settings for network connection (Step S123: YES), the control unit 101 controls the playback unit 106 and the display unit 107 to display the network connection settings screen (Step S124). Next, the control unit 101 receives settings for network connection on the network connection settings screen (Step S125). Then, the flow returns to Step S104 to repeat processing.

3.5 Modification (5)

The following describes a TV receiver 100 as Modification (5) of the above embodiments.

In the above embodiments, when the connection check unit 109 judges that the TV receiver 100 is not connected to the network 20, the power unit 110 immediately powers off the TV receiver 100. In Modification (5) compared with this, the connection check unit 109 checks the past connection statuses to the network 20 to judge whether a condition is satisfied. When judging that the condition is satisfied, the control unit 101 permits the TV receiver 100 to receive and play back a broadcast wave and perform other operations. When judging that the condition is not satisfied, the control unit 101 powers off the TV receiver 100. Modification (5) differs in this point from the above embodiments.

The following mainly describes different points between Modification (5) and the above embodiments.

The TV receiver 100 stores therein pieces of network connection information each indicating whether the TV receiver 100 has been connected to the network 20 in the past. For example with respect to the last five time network connection statuses of the TV receiver 100 in the power-on mode, the TV receiver 100 stores therein respective pieces of network connection information indicating "Last time: Connected", "Two times before: Unconnected", "Three times before: Connected", "Four times before: Connected", and "Five times before: Unconnected". In the case where a condition is determined for example that "forcible power-off is unnecessary if a rate of pieces of network connection information indicating that the terminal device has been connected among all of the pieces of network connection information is 50% or more", the control unit 101 judges that the condition is satisfied based on the pieces of connection information with respect to the last five time network connection statuses. In other words, the control unit 101 judges that it is unnecessary to power off the TV receiver 100.

The storage unit 102 further stores therein a network connection status table 161 shown in FIG. 12 as an example.

The network connection status table 161 has a region for storing a plurality of pieces of connection information. The pieces of connection information each include connection time information and connection status information. The connection time information indicates a time when a check as to the network connection status has been made in the past. The connection status information indicates a network connection status at the time indicated by the connection time information. The network connection status is in one of a status "Connected" indicating that the TV receiver 100 is connected to the network 20 and a status "Unconnected" indicating that the TV receiver 100 is not connected to the network 20.

As shown in FIG. 12, the network connection status table 161 includes connection time information 172 indicating "Last time" and connection status information 162 indicating "Connected" in correspondence with each other. This means that the TV receiver 100 has been connected to the network 20 at the last check of network connection status. Also, the network connection status table 161 includes connection time information 178 indicating "Seven times before" and connection status information 168 indicating "Unconnected" in correspondence with each other. This means that the TV receiver 100 has not been connected to the network 20 at the check of network connection status made seven times before.

When the connection check unit 109 judges that the TV receiver 100 is not connected to the network, the control unit 101 judges whether the network connection status satisfies a predetermined condition with use of the network connection status table in the following manner.

The control unit 101 stores therein beforehand a threshold value of 0.5. The threshold value of 0.5 is just an example, and alternatively the threshold value may be 0.4, 0.8, 0.7, 0.6, or the like.

The control unit 101 calculates a rate of pieces of connection information indicating "Connected" among all of the pieces of connection information included in the network connection status table 161.

Rate=the number of pieces of connection information indicating "Connected"/the number of all pieces of connection information Next, the control unit 101 judges whether the calculated rate is equal to or higher than the threshold value of 0.5.

When judging that the calculated rate is equal to or higher than the threshold value of 0.5, the control unit 101 permits the TV receiver 100 to receive and play back a broadcast wave and perform other operations.

When judging that the calculated rate is lower than the threshold value of 0.5, the control unit 101 controls the power unit 110 to suspend supply of electrical power to the input reception unit 108, the communication unit 103, the connection check unit 109, the storage unit 102, and the control unit 101. In other words, the power unit 110 switches the TV receiver 100 to the complete off mode.

Figure 13:
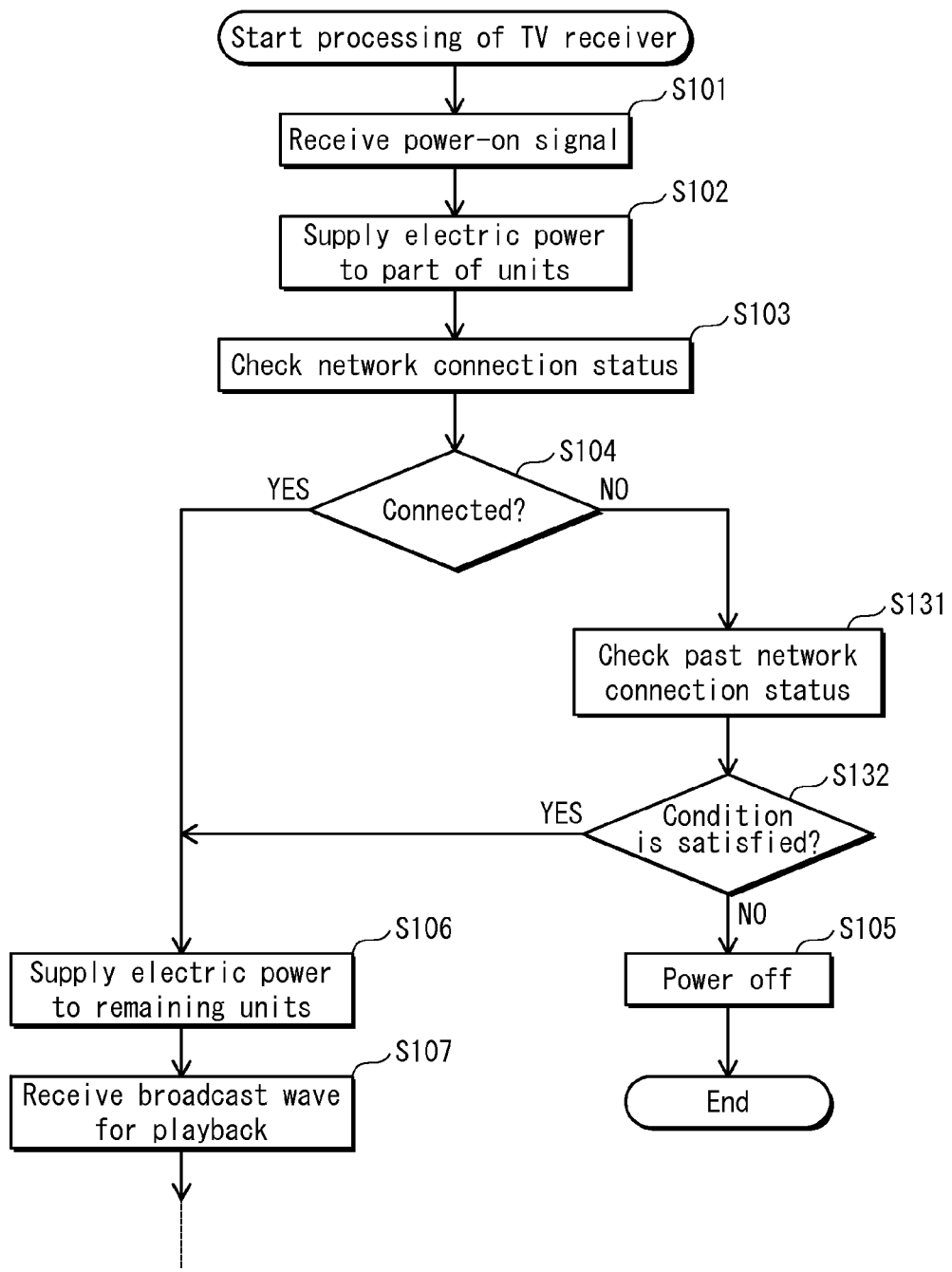
FIG. 13 is a flow chart showing operations of a TV receiver 100 as Modification (5).

The following describes operations of the TV receiver 100 in the standby mode in the case where the TV receiver 100 is powered on through the user's operation performed on the remote control 111, with reference to a flow chart shown in FIG. 13.

The input reception unit 108 receives an operation signal indicating power-on from the remote control 111 (Step S101). Next, the power unit 110 supplies electrical power to the control unit 101, the storage unit 102, the communication unit 103, and the connection check unit 109 (Step S102).

The connection check unit 109 checks whether the TV receiver 100 is connected to the network 20 (Step S103). When judging that the TV receiver 100 is connected to the network 20 (Step S104: YES), the power unit 110, under control of the control unit 101, supplies electrical power to the broadcast wave reception unit 104, the decoding unit 105, the playback unit 106, the display unit 107, and the update unit 113 (Step S106). The broadcast wave reception unit 104 selects a broadcast stream from the broadcast wave, and demodulates the selected broadcast stream. The decoding unit 105 separates the broadcast stream to generate a video stream and an audio stream. Next, the decoding unit 105 decodes the video stream and the audio stream to generate a digital video signal and a digital audio signal, respectively. The playback unit 106 generates an analog video signal and an analog audio signal. The display unit 107 displays a video of a broadcast program and outputs an audio of the broadcast program (Step S107).

When judging that the TV receiver 100 is not connected to the network 20 on the other hand (Step S104: NO), the control unit 101 calculates a rate of pieces of connection information indicating "Connected" among all of the pieces of connection information included in the network connection status table 161 thereby to check the network connection status (Step S131).

Next, the control unit 101 judges whether the network connection status satisfies a predetermined condition. Specifically, the control unit 101 judges whether the calculated rate is equal to or higher than the threshold value of 0.5 (Step S132).

When the control unit 101 judges that the calculated rate is equal to or higher than the threshold value of 0.5, that is, the condition is satisfied (Step S132: YES), the flow proceeds to Step S106.

When the control unit 101 judges that the calculated rate is lower than the threshold value of 0.5, that is, the condition is not satisfied (Step S132: NO), the invalidation unit 115 included in the control unit 101 controls the power unit 110 to forcibly suspend supply of electrical power to the input reception unit 108, the communication unit 103, the connection check unit 109, the storage unit 102, and the control unit 101. In other words, the invalidation unit 115 switches the TV receiver 100 to the complete off mode (Step S105).

3.6 Modification (6)

The following describes a TV receiver 100 as Modification (6) of the above embodiments.

In the above embodiments, when the connection check unit 109 judges that the TV receiver 100 is not connected to the network 20, the power unit 110 immediately powers off the TV receiver 100. In Modification (6) compared with this, the control unit 101 for example acquires natural disaster information, and judges whether the acquired natural disaster information satisfies a predetermined condition. When judging that the natural disaster information satisfies the condition, the control unit 101 permits the TV receiver 100 to receive and play back a broadcast wave and perform other operations. When judging that the natural disaster information does not satisfy the condition, the power unit 110 powers off the TV receiver 100. Modification (6) differs in this point from the above embodiments.

The following mainly describes different points between Modification (6) and the above embodiments.

A plurality of levels are set for a natural disaster in accordance with a degree of a possible occurrence thereof. Natural disaster information includes levels such as an information provision level, a warning level, an alert level, and an order level. The information provision level is a level for indicating a low degree of the natural disaster and just providing information. The warning level is a level for indicating a slightly high degree of the natural disaster and warning to watch the natural disaster. The alert level is a level for indicating a high degree of the natural disaster and alerting to evacuate. The order level is a level for indicating an extremely high degree of the natural disaster and ordering to evacuate. The levels each have a value in accordance with the degree thereof. A level having a higher degree of a natural disaster has a higher value. For example, the information provision level has a value of 1, the warning level has a value of 2, the alert level has a value of 3, and the order level has a value of 4.

The TV receiver 100 stores therein a threshold value for level of a natural disaster, such as a threshold value of 2.

When the TV receiver 100 in the complete off mode is powered on by the user with the power button of the button operation unit 114, the power unit 110 supplies electrical power to all of the structural elements of the TV receiver 100. When the TV receiver 100 in the standby mode is powered on by the user with the power button of the remote control 111, the power unit 110 supplies electrical power to all of the remaining structural elements, in addition to the input reception unit 108 to which electrical power has already been supplied.

When the TV receiver 100 is powered on, the connection check unit 109 makes a check as to whether the TV receiver 100 is connected to the network 20. During the check, the broadcast wave reception unit 104, the decoding unit 105, the playback unit 106, and the display unit 107 continue to reception and demodulation, decoding, playback, and display and output with respect to the broadcast wave, respectively.

When the connection check unit 109 judges that the TV receiver 100 is connected to the network 20, the broadcast wave reception unit 104, the decoding unit 105, the playback unit 106, and the display unit 107 continue to reception and demodulation, decoding, playback, and display and output with respect to the broadcast wave, respectively.

When the connection check unit 109 judges that the TV receiver 100 is not connected to the network 20, the broadcast wave reception unit 104 selects a broadcast stream from the broadcast wave, demodulates the selected broadcast stream, and acquires natural disaster information from the broadcast stream. Next, the connection check unit 109 judges whether the acquired natural disaster information satisfies a predetermined condition. Specifically, the connection check unit 109 judges whether a level included in the natural disaster information is lower than the threshold value.

For example, when the natural disaster information indicates warning, advices to residents to emergently evacuate, or orders to residents to emergently evacuate, that is, when a level included in the natural disaster information is equal to or higher than the threshold value of 2, the control unit 101 judges that the natural disaster information satisfies the predetermined condition, and permits continuation of reception and playback of a broadcast wave and other operations.

When the natural disaster information neither indicates warning, advices to residents to emergently evacuate, nor orders to residents to emergently evacuate, that is, when the level included in the natural disaster information is lower than the threshold value of 2, the control unit 101 judges that the natural disaster information does not satisfy the predetermined condition, and suspends supply of electrical power to all of the structural elements of the TV receiver 100.

Also, when the connection check unit 109 acquires information predicting a possibility that the server device 200 and/or the network 20 is down due to a natural disaster such as an earthquake and a heavy rain, the control unit 101 may judge that the predetermined condition is satisfied.

Figure 14:
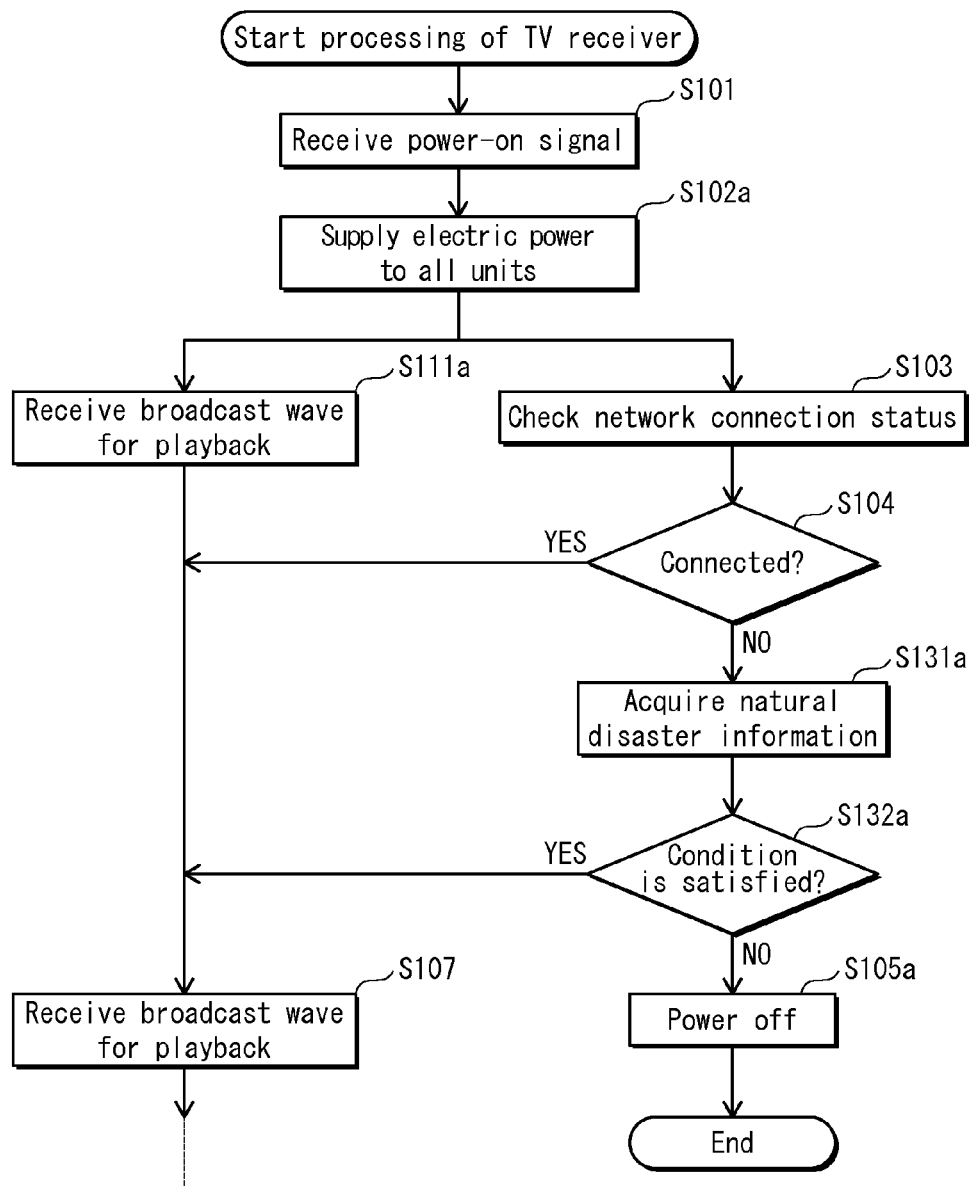
FIG. 14 is a flow chart showing operations of a TV receiver 100 as Modification (6).

The following describes operations of the TV receiver 100 in the standby mode in the case where the TV receiver 100 is powered on through the user's operation performed on the remote control 111, with reference to a flow chart shown in FIG. 14.

The input reception unit 108 receives an operation signal indicating power-on from the remote control 111 (Step S101). Then, the power unit 110 supplies electrical power to all of the structural elements of the TV receiver 100 (Step S102a).

When supply of electrical power is commenced, the connection check unit 109 checks whether the TV receiver 100 is connected to the network 20 (Step S103).

When supply of electrical power is commenced, the broadcast wave reception unit 104 selects a broadcast stream from the broadcast wave, and demodulates the selected broadcast stream, in the same time period in which the operations of Step S103 are performed. The decoding unit 105 separates the broadcast stream to generate a video stream and an audio stream. Next, the decoding unit 105 decodes the video stream and the audio stream to generate a digital video signal and a digital audio signal, respectively. The playback unit 106 generates an analog video signal and an analog audio signal. The display unit 107 displays a video of a broadcast program and outputs an audio of the broadcast program (Step S111a).

When the connection check unit 109 judges that the TV receiver 100 is connected to the network 20 (Step S104: YES), the broadcast wave reception unit 104 continues to select a broadcast stream from the broadcast wave, and demodulate the selected broadcast stream. The decoding unit 105 continues to separate the broadcast stream to generate a video stream and an audio stream. Next, the decoding unit 105 continues to decode the video stream and the audio stream to generate a digital video signal and a digital audio signal, respectively. The playback unit 106 continues to generate an analog video signal and an analog audio signal. The display unit 107 continues to display a video of a broadcast program and outputs an audio of the broadcast program (Step S107).

When the connection check unit 109 judges that the TV receiver 100 is not connected to the network 20 (Step S104: NO), the broadcast wave reception unit 104 selects a broadcast stream from the broadcast wave, demodulates the selected broadcast stream, and acquires natural disaster information from the broadcast stream (Step).

Next, the control unit 101 judges whether the acquired natural disaster information satisfies a predetermined condition (Step S132*a*).

When the control unit 101 judges that the natural disaster information satisfies the predetermined condition (Step S132*a*: YES), the flow proceeds to Step S107.

When the natural disaster information does not satisfy the predetermined condition (Step S132*a*: NO), the power unit 110, under control of the invalidation unit 115 included in the control unit 101, forcibly suspends supply of electrical power to all of the structural elements of the TV receiver 100. In other words, the power unit 110 switches the TV receiver 100 to the complete off mode (Step S105*a*). This completes the operations of the TV receiver 100.

3.7 Modification (7)

The following describes a TV receiver 100 as Modification (7) of the above embodiments.

In the above embodiments, when the connection check unit 109 judges that the TV receiver 100 is not connected to the network 20, the power unit 110 immediately powers off the TV receiver 100. In Modification (7) compared with this, permission information is acquired for example. The permission information permits the TV receiver 100 not to be forcibly powered off even if the TV receiver 100 is not connected to the network. The control unit 101 judges whether the acquired permission information indicates to exempt the TV receiver 100 from power-off. When judging that the permission information indicates to exempt the TV receiver 100 from power-off, the control unit 101 permits the TV receiver 100 to receive and play back a broadcast wave and perform other operations. When the control unit 101 judges that the permission information does not indicate to exempt the TV receiver 100 from power-off, the power unit 110 powers off the TV receiver 100. Modification (7) differs in this point from the above embodiments.

The following mainly describes different points between Modification (7) and the above embodiments.

The storage unit 102 stores therein a public key assigned to a generator of permission information.

Figure 15:
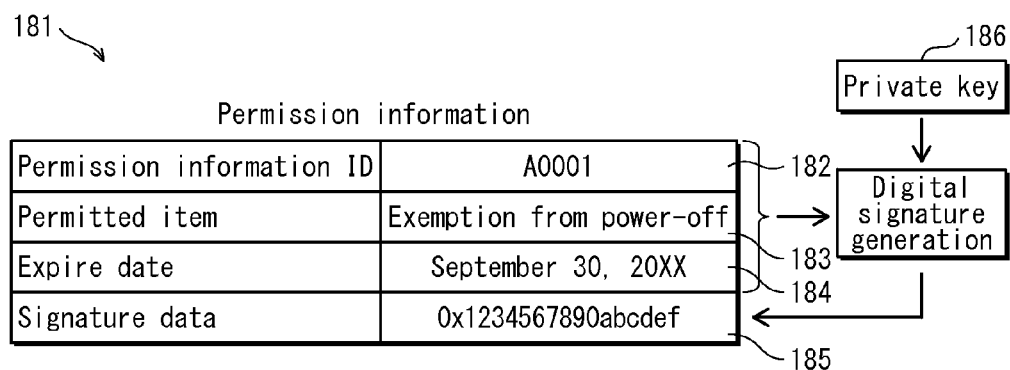
FIG. 15 shows an example of a data structure of permission information 181 in Modification (7).

Also, the storage unit 102 stores therein permission information 181 as shown in FIG. 15 as an example. The permission information 181 is composed of a permission information ID 182, a permitted item 183, an expire date 184, and signature data 185.

Here, the permission information ID 182 is identification information for uniquely identifying the permission information.

The permitted item 183 indicates an item that is permitted by the permission information. The permitted item 183 indicates exemption from power-off, for example.

The expire date 184 indicates an expire date of the permission information.

The signature data 185 is generated by performing digital signature generation on signature target data with use of a private key 186 assigned to a generator of the permission information 181. Here, the signature target data is a combination obtained by combining the permission information ID 182, the permitted item 183, and the expire date 184 in respective order.

Signature data=Sign(private key assigned to generator of permission information,permission information ID‖permitted item‖expire date)

Here, S=Sign (A,B) represents signature data generated by performing digital signature generation on data B with use of private key A. The digital signature generation for example represents a digital signature algorithm that is ECDSA (Elliptic Curve Digital Signature Standard). Also, A‖B represents a combination obtained by combining data A and data B in respective order.

Alternatively, the communication unit 103 may acquire permission information via other terminal device such as a smart phone and a PC. Alternatively, the TV receiver 100 may receive and store therein permission information by a wireless technique such as NFC (Near Field Communication) and Bluetooth. For example, permission information is issued or purchasable while the server device or the network is down. Alternatively, once the TV receiver 100 is connected to the network, the TV receiver 100 may download permission information available for subsequent use from the server device 200 and store therein the downloaded permission information.

The control unit 101 reads permission information from the storage unit 102. Next, the control unit 101 judges whether a permitted item included in the permission information indicates exemption from power-off.

When the permitted item does not indicate exemption from power-off, the power unit 110, under control of the control unit 101, forcibly suspends supply of electrical power to the input reception unit 108, the communication unit 103, the connection check unit 109, the storage unit 102, and the control unit 101.

The control unit 101 reads a public key from the storage unit 102. Next, the control unit 101 performs digital signature verification V on a permission information ID, the permitted item, an expire date, and signature data which are included in the permission information, with use of the read public key.

Here, the digital signature verification V for example represents a digital signature algorithm that is ECDSA (Elliptic Curve Digital Signature Standard).

When the digital signature verification fails, the power unit 110, under control of the control unit 101, forcibly suspends supply of electrical power to the input reception unit 108, the communication unit 103, the connection check unit 109, the storage unit 102, and the control unit 101.

The control unit 101 acquires a current time, and judges whether the acquired current time is prior to the expire date included in the permission information. When the current time is posterior to the expire date, the power unit 110, under control of the control unit 101, forcibly suspends supply of electrical power to the input reception unit 108, the communication unit 103, the connection check unit 109, the storage unit 102, and the control unit 101.

When the permitted item indicates exemption from power-off, the digital signature verification succeeds, and the current time is prior to expire date, the control unit 101 permits the TV receiver 100 to receive and play back a broadcast wave and perform other operations.

Figure 16:
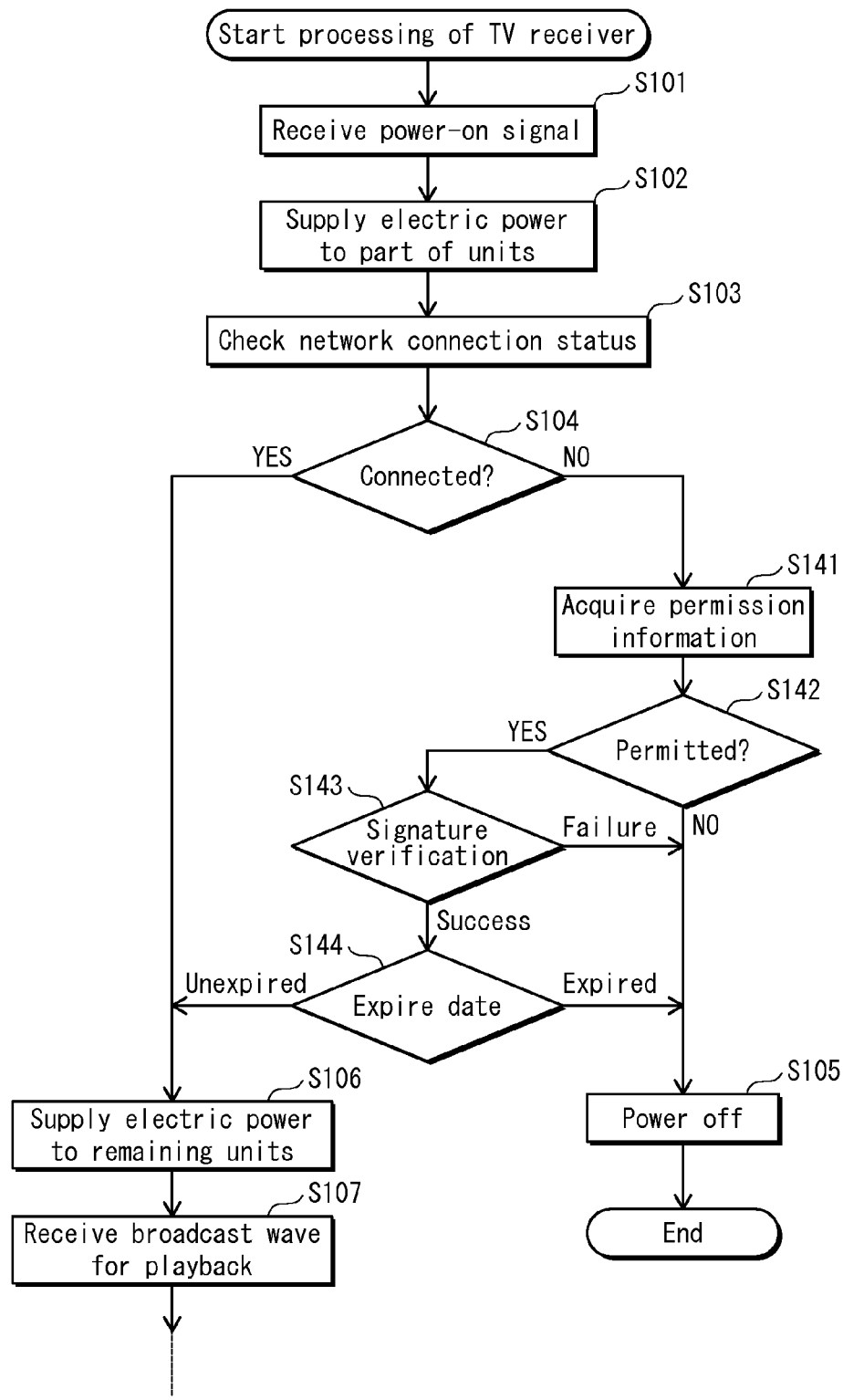
FIG. 16 is a flow chart showing operations of a TV receiver 100 as Modification (7).

The following describes operations of the TV receiver 100 in the standby mode in the case where the TV receiver 100 is powered on through the user's operation performed on the remote control 111, with reference to a flow chart shown in FIG. 16.

The input reception unit 108 receives an operation signal indicating power-on from the remote control 111 (Step S101). Next, the power unit 110 supplies electrical power to the control unit 101, the storage unit 102, the communication unit 103, and the connection check unit 109 (Step S102).

The connection check unit 109 checks whether the TV receiver 100 is connected to the network 20 (Step S103).

When the connection check unit 109 judges that the TV receiver 100 is connected to the network 20 (Step S104: YES), the power unit 110, under control of the control unit 101, supplies electrical power to the broadcast wave reception unit 104, the decoding unit 105, the playback unit 106, the display unit 107, and the update unit 113 (Step S106). The broadcast wave reception unit 104 selects a broadcast stream from the broadcast wave, and demodulates the selected broadcast stream. The decoding unit 105 separates the broadcast stream to generate a video stream and an audio stream. Next, the decoding unit 105 decodes the video stream and the audio stream to generate a digital video signal and a digital audio signal, respectively. The playback unit 106 generates an analog video signal and an analog audio signal. The display unit 107 displays a video of a broadcast program and outputs an audio of the broadcast program (Step S107).

When the connection check unit 109 judges that the TV receiver 100 is not connected to the network 20 (Step S104: NO), the control unit 101 reads permission information from the storage unit 102 (Step S141). Next, the control unit 101 judges whether a permitted item included in the permission information indicates exemption from power-off (Step S142).

When the permitted item does not indicate exemption from power-off (Step S142: NO), the power unit 110, under control of the invalidation unit 115 included in the control unit 101, forcibly suspends supply of electrical power to the input reception unit 108, the communication unit 103, the connection check unit 109, the storage unit 102, and the control unit 101. In other words, the power unit 110 switches the TV receiver 100 to the complete off mode (Step S105). This completes the operations of the TV receiver 100.

The control unit 101 performs digital signature verification V on a permission information ID, the permitted item, an expire date, and signature data which are included in the permission information, with use of the read public key (Step S143).

When the digital signature verification fails (Step S143: Failure), the flow proceeds to Step S105 and the control unit 101 forcibly suspends supply of electrical power.

The control unit 101 acquires a current time, and judges whether the acquired current time is prior to the expire date included in the permission information (Step S144). When the current time is posterior to the expire date (Step S144: Expired), the flow proceeds to Step S105 and the control unit 101 forcibly suspends supply of electrical power.

When the permitted item indicates exemption from power-off (Step S142: YES), the digital signature verification succeeds (Step S143: Success), and the current time is prior to the expire date (Step S144: Unexpired), the flow proceeds to Step S106.

3.8 Modification (8)

The following describes a TV receiver 100 as Modification (8) of the above embodiments.

In the above embodiments, when the connection check unit 109 judges that the TV receiver 100 is not connected to the network 20, the power unit 110 immediately powers off the TV receiver 100. In Modification (8) compared with this, permission information is acquired for example. The permission information permits the TV receiver 100 not to be forcibly powered off even if the TV receiver 100 is not connected to the network. The control unit 101 judges whether the acquired permission information indicates to exempt the TV receiver 100 from power-off. When judging that the permission information indicates to exempt the TV receiver 100 from power-off, the control unit 101 permits the TV receiver 100 to receive and play back a broadcast wave and perform other operations. When the control unit 101 judges that the permission information does not indicate to exempt the TV receiver 100 from power-off, the power unit 110 powers off the TV receiver 100. Modification (8) differs in this point from the above embodiments.

Also, the permission information relating to Modification (8) includes an update program. The update program is a program for updating the control program included in the TV receiver 100. The permission information forces the TV receiver 100 to update the control program included therein. Modification (8) differs in this point from Modification (7).

The following mainly describes different points between Modification (8) and Modification (7).

The storage unit 102 stores therein a public key assigned to a generator of permission information.

Figure 17:
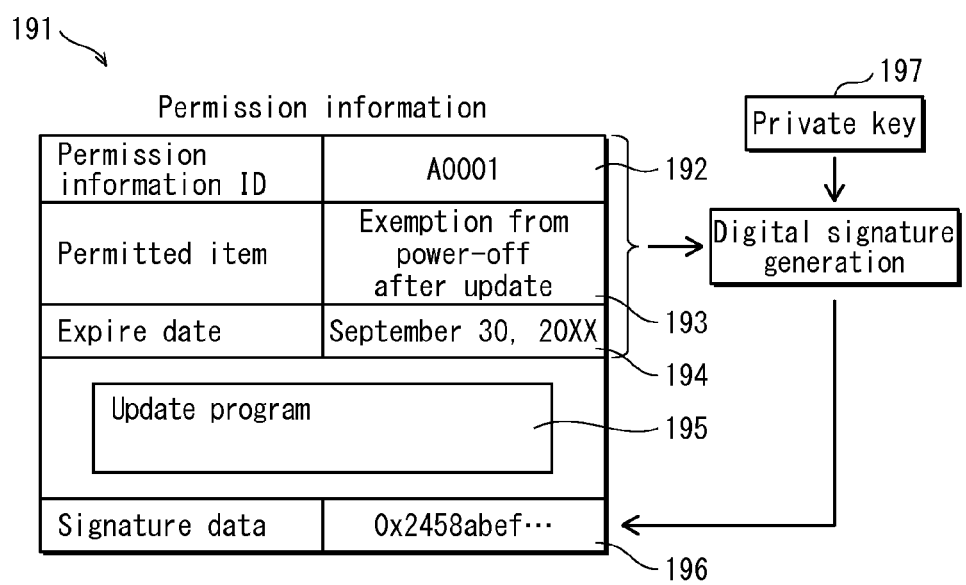
FIG. 17 shows an example of a data structure of permission information 191 in Modification (8).

Also, the storage unit 102 stores therein permission information 191 as shown in FIG. 17 as an example. The permission information 191 is composed of a permission information ID 192, a permitted item 193, an expire date 194, an update program 195, and signature data 196.

Here, the permission information ID 192 is identification information for uniquely identifying the permission information.

The permitted item 193 indicates an item that is permitted by the permission information. The permitted item 193 indicates exemption from power-off after update, for example.

The expire date 194 indicates an expire date of the permission information.

The update program 195 is a program for updating the control program included in the TV receiver 100.

The signature data 196 is generated by performing digital signature generation on signature target data with use of a private key 197 assigned to a generator of the permission information 191. Here, the signature target data is a combination obtained by combining the permission information ID 192, the permitted item 193, the expire date 184, and the update program 195 in respective order.

Signature data=Sign(private key assigned to generator of permission information,permission information ID∥permitted item∥expire date∥update program)

When the permitted item indicates exemption from power-off after update, the digital signature verification succeeds, and the current time is prior to the expire date, the control unit 101 generates a screen for inquiring of a user as to whether to update the control program with use of the update program, and controls the display unit 107 to display the screen via the playback unit 106.

When the control unit 101 receives an instruction not to update the control program via the input reception unit 108 through an operation performed on the remote control 111, the power unit 110, under control of the control unit 101, forcibly suspends supply of electrical power to the input reception unit 108, the communication unit 103, the connection check unit 109, the storage unit 102, and the control unit 101. In other words, the power unit 110 switches the TV receiver 100 to the complete off mode.

When receiving the instruction to update the control program via the input reception unit 108 through the operation performed on the remote control 111, the control unit 101 updates the control program stored in the storage unit 102 by replacing the stored control program with the update program 195 included in the permission information 191.

Next, after updating the control program, the control unit 101 permits the TV receiver 100 to receive and play back a broadcast wave and perform other operations.

Figure 18:
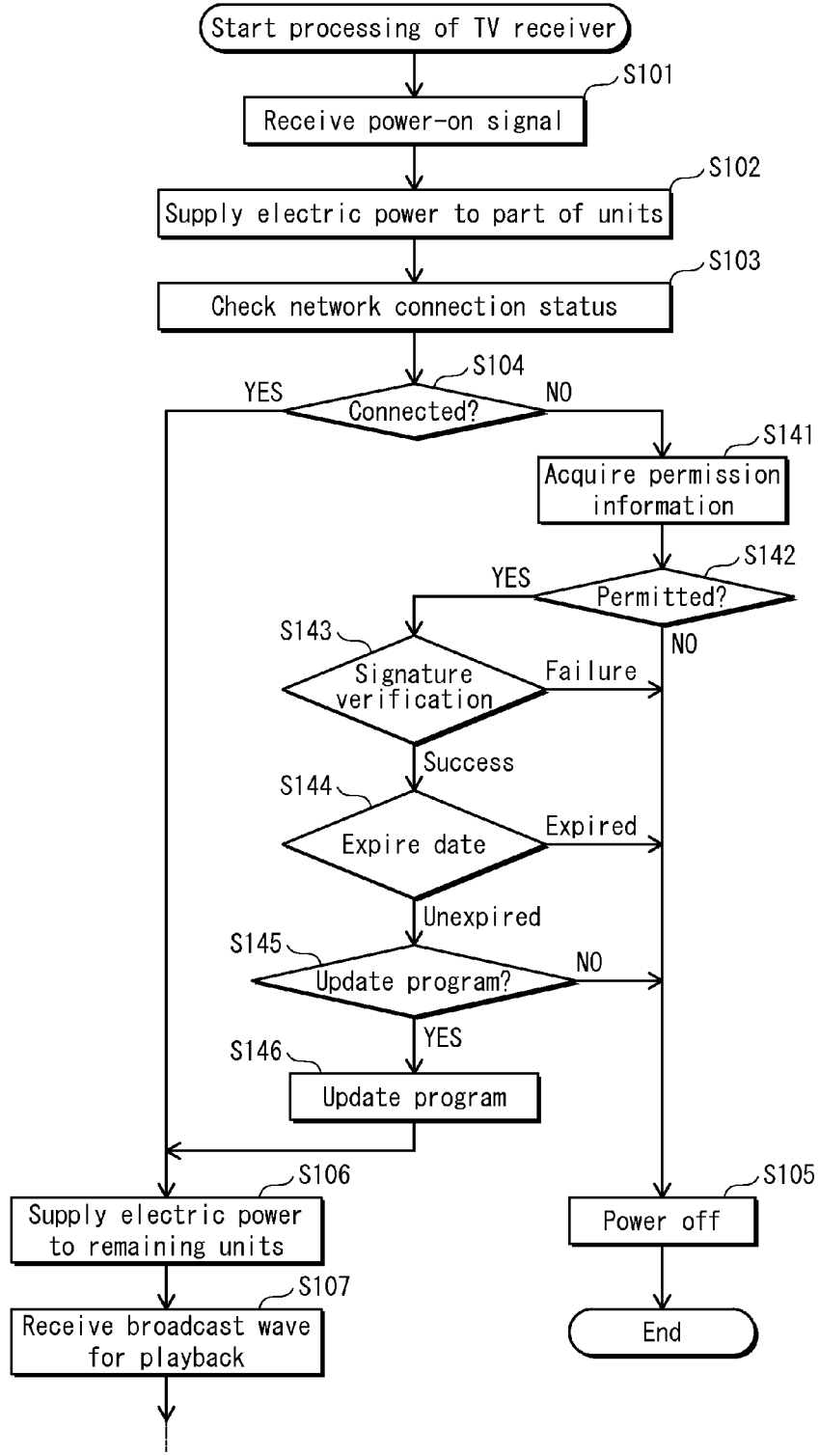
FIG. 18 is a flow chart showing operations of a TV receiver 100 as Modification (8).

The following describes operations of the TV receiver 100 in the standby mode in the case where the TV receiver 100 is powered on through the user's operation performed on the remote control 111, with reference to a flow chart shown in FIG. 18.

The input reception unit 108 receives an operation signal indicating power-on from the remote control 111 (Step S101). Next, the power unit 110 supplies electrical power to the control unit 101, the storage unit 102, the communication unit 103, and the connection check unit 109 (Step S102).

The connection check unit 109 checks whether the TV receiver 100 is connected to the network 20 (Step S103).

When the connection check unit 109 judges that the TV receiver 100 is connected to the network 20 (Step S104: YES), the power unit 110, under control of the control unit 101, supplies electrical power to the broadcast wave reception unit 104, the decoding unit 105, the playback unit 106, the display unit 107, and the update unit 113 (Step S106). The broadcast wave reception unit 104 selects a broadcast stream from the broadcast wave, and demodulates the selected broadcast stream. The decoding unit 105 separates the broadcast stream to generate a video stream and an audio stream. Next, the decoding unit 105 decodes the video stream and the audio stream to generate a digital video signal and a digital audio signal, respectively. The playback unit 106 generates an analog video signal and an analog audio signal. The display unit 107 displays a video of a broadcast program and outputs an audio of the broadcast program (Step S107).

When the connection check unit 109 judges that the TV receiver 100 is not connected to the network 20 on the other hand (Step S104: NO), the control unit 101 reads permission information from the storage unit 102 (Step S141). Next, the control unit 101 judges whether a permitted item included in the permission information indicates exemption from power-off after update (Step S142).

When the permitted item does not indicate exemption from power-off after update (Step S142: NO), the power unit 110, under control of the invalidation unit 115 included in the control unit 101, forcibly suspends supply of electrical power to the input reception unit 108, the communication unit 103, the connection check unit 109, the storage unit 102, and the control unit 101. In other words, the power unit 110 switches the TV receiver 100 to the complete off mode (Step S105). This completes the operations of the TV receiver 100.

The control unit 101 performs digital signature verification V on a permission information ID, the permitted item, an expire date, an update program, and signature data which are included in the permission information, with use of the read public key (Step S143).

When the digital signature verification fails (Step S143: Failure), the flow proceeds to Step S105 and the control unit 101 forcibly suspends supply of electrical power.

The control unit 101 acquires a current time, and judges whether the acquired current time is prior to the expire date included in the permission information (Step S144). When the current time is posterior to the expire date (Step S144: Expired), the flow proceeds to Step S105 and the control unit 101 forcibly suspends supply of electrical power.

When the permitted item indicates exemption from power-off after update (Step S142: YES), the digital signature verification succeeds (Step S143: Success), and the current time is prior to the expire date (Step S144: Unexpired), the control unit 101 inquires of the user as to whether to update the control program (Step S145). When receiving an instruction not to update the control program from the user (Step S145: NO), the flow proceeds to Step S105 and the control unit 101 forcibly suspends supply of electrical power.

When receiving an instruction to update the control program from the user (Step S145: YES), the control unit 101 updates the control program stored in the storage unit 102 with the update program (Step S146). Then, the flow proceeds to Step S106.

3.9. Other Modifications (1) In the above Modification (2), the TV receiver 100 stores therein beforehand a special video in shipping. Also, in the above Modifications (3) and (4), the TV receiver 100 stores therein beforehand a warning text in shipping.

However, the present invention is not limited by these structures. Alternatively, the special video and the warning text may be stored in the TV receiver 100 after shipping, as described below. Further alternatively, the special video and the warning text that are stored in the TV receiver 100 may be updated after shipping.

The server device 200 may store therein a special video and a warning text. The TV receiver 100 is connected to the server device 200 via the network 20, and acquires the special video and the warning text from the server device 200, and stores therein the acquired special video and warning text. Also, the TV receiver 100 may update a special video and a warning text which have been stored therein beforehand with the acquired special video and warning text, respectively.

Also, the program broadcast device may store therein a special video and a warning text. The program broadcast device broadcasts the special video and the warning text over a broadcast wave. The TV receiver 100 receives the broadcast wave, extracts the special video and the warning text from the received broadcast wave, and stores therein the extracted special video and warning text. Also, the TV receiver 100 may update a special video and a warning text which have been stored therein beforehand with the acquired special video and warning text, respectively.

(2) In the above Modification (1), a broadcast wave is received for playback in a time period in which an operation signal indicating power-on is received, supply of electrical power all of the structural elements of the TV receiver 100 is commenced, and then a check is made as to whether the TV receiver 100 is connected to the network 20.

In this case, display may be performed with decreased luminance and/or resolution, as a provisional display until the check of the network connection status completes. Also, monaural audio output may be performed. In this way, until the check of the network connection status completes, the TV receiver 100 may display images with a decreased image quality and output an audio with a decreased audio quality, compared with original ones of a broadcast program received by the broadcast wave reception unit 104.

(3) In the above Modification (3), the warning text 141 shown in FIG. 8 is displayed. However, the present invention is not limited by this structure. The following structure may be employed.

As described in Modification (1), a broadcast wave is received for playback in a time period in which an operation signal indicating power-on is received, supply of electrical power all of the structural elements of the TV receiver 100 is commenced, and then a check is made as to whether the TV receiver 100 is connected to the network 20. Next, a check is made as to whether the TV receiver 100 is connected to the network. When the TV receiver 100 is not connected to the network, a warning text may be displayed so as to be overlaid on an image which is displayed on the screen. The warning text may be displayed so as to move on the screen.

Also, when the TV receiver 100 is not connected to the network, an image which is played back may be size-reduced and displayed in order to display a warning text on a blank space on the screen resulting from the size reduction of the image.

(4) In the above embodiments and modifications, the description has been provided with use of the TV receiver 100 as an example. However, the present invention is not limited to a TV receiver. Alternatively, the present invention may be applicable to any home electric appliance having a network interface (electric appliance and device for household use).

For example, the present invention may be applicable to a content playback apparatus, a content recording apparatus, a video device such as a video camera, and an acoustic device. Furthermore, the present invention may be applicable to a home electric appliance such as a rice cooker, a refrigerator, a washing machine, a microwave oven, and an air conditioner. Moreover, the present invention may be applicable to an information electric appliance such as a PC, a FAX, a mobile phone, a smart phone, and a tablet terminal.

(5) In the above embodiments and modifications, supply of electrical power to the TV receiver 100 is suspended when the TV receiver 100 is not connected to a network, when the TV receiver 100 is not connected to the network and a predetermined condition is not satisfied, or when the TV receiver 100 is not connected to the network and the above permission is not given.

However, the present invention is not limited by this method.

The TV receiver 100 may include an invalidation unit configured to validate only part of functions included in the TV receiver 100 and invalidate remaining of the functions, when the TV receiver 100 is not connected to a network, when the TV receiver 100 is not connected to the network and a predetermined condition is not satisfied, or when the TV receiver 100 is not connected to the network and the above permission is not given.

For example, the TV receiver 100 may permit viewing of a broadcast program but invalidate a function of displaying a video that is input from an external input terminal for viewing a program stored in an HDD recorder or the like, when the TV receiver 100 is not connected to a network, when the TV receiver 100 is not connected to the network and a predetermined condition is not satisfied, or when the TV receiver 100 is not connected to the network and the above permission is not given.

Figure 19:
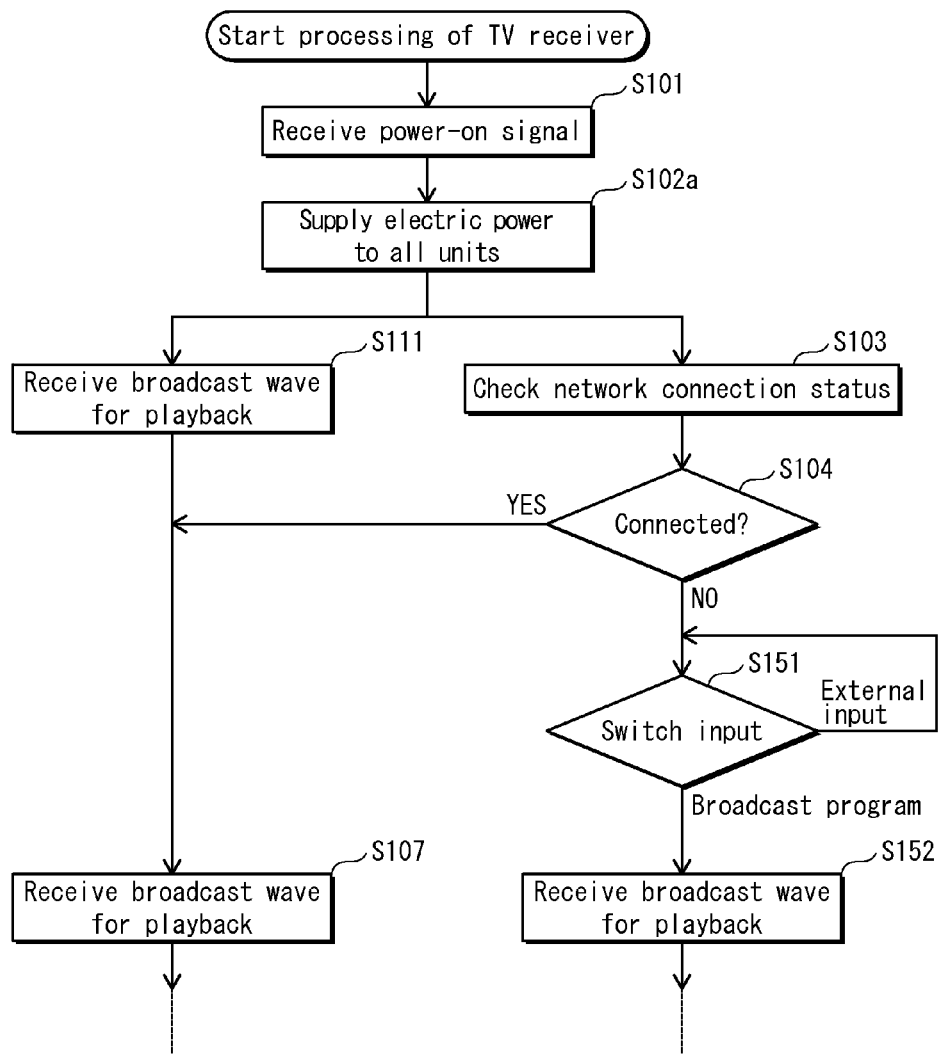
FIG. 19 is a flow chart showing operations of a TV receiver 100 as other modification.

The following describes operations of the TV receiver 100 in the standby mode in the case where the TV receiver 100 is powered on through the user's operation performed on the remote control 111, with reference to a flow chart shown in FIG. 19.

Steps S101, S102*a*, S111, S103, S104, and S107 in FIG. 19 are the same as Steps S101, S102*a*, S111, S103, S104, and S107 in FIG. 6, respectively.

In FIG. 19, instead of Step S105*a* in FIG. 6, when the control unit 101 receives an operation signal for switching input in the TV receiver 100 from the input reception unit 108, the control unit 101 judges whether the operation signal indicates switching to reception of a program from the antenna 112 or switching to input of a program from an external input terminal (Step S151). Switching input is an operation for switching a program to be displayed by the display unit 107 between a program received from the antenna 112 and a program input from an external input terminal.

When the operation signal indicates switching to reception of a program from the antenna 112 (Step S151: Broadcast program), the broadcast wave reception unit 104 selects a broadcast stream from a broadcast wave, and demodulates the selected broadcast stream. The decoding unit 105 separates the broadcast stream to generate a video stream and an audio stream. Next, the decoding unit 105 decodes the video stream and the audio stream to generate a digital video signal and a digital audio signal, respectively. The playback unit 106 generates an analog video signal and an analog audio signal. The display unit 107 displays a video of a broadcast program and outputs an audio of the broadcast program (Step S152).

When the operation signal indicates switching to reception of a program from the external input terminal (Step S151: External input), the invalidation unit 115 included in the control unit 101 cancels the operation signal, and the flow returns to Step S151 to repeat processing. In this way, the invalidation unit 115 invalidates the function of displaying a video that is input from an external input terminal.

An HDD recorder may include a control unit configured to permit playback of recorded programs but not permit recording of programs, when the HDD recorder is not connected to a network, when the HDD recorder is connected to the network and a predetermined condition is not satisfied, or when the HDD recorder is not connected to the network and the above permission is not given. In other words, an invalidation unit included in the control unit invalidates a function of recording programs.

Also, a microwave oven may include a control unit configured to permit heating operations but not permit operations of a complicated cooking function, when the microwave oven is not connected to a network, when the microwave oven is connected to the network and a predetermined condition is not satisfied, or when the microwave oven is not connected to the network and the above permission is not given. In other words, an invalidation unit included in the control unit invalidates the complicated cooking function.

Furthermore, an air conditioner may include a control unit configured to permit operations of a function of switching between cooling and heating, a temperature setting function, and so on but not permit operations of a timer function, an energy-saving function, and so on, when the microwave oven is not connected to a network, when the microwave oven is connected to the network and a predetermined condition is not satisfied, or when the microwave oven is not connected to the network and the above permission is not given. Alternatively, the control unit included in the air conditioner may in such a case. In other words, an invalidation unit included in the control unit invalidates the timer function, the energy-saving function, and so on.

(6) In the above embodiments and modifications, a single device has a plurality of functions (structural elements). However, the present invention is not limited by this structure. Alternatively, a plurality of functions (structural elements) may be separately included in a plurality of devices, such that the plurality of devices each have a function (structural element). The effects and functions that are same as described above may be realized through a combination of the plurality of devices.

(7) The present invention may have the following structure.

One aspect of the present invention provides a network connection terminal that has a network interface. The network connection terminal includes: a receiving means configured to receive an instruction of an operation from a user; a connecting means configured to connect to a network and perform transmission and reception of data; a connection checking means configured to perform a check of a connection state of the connecting means, the connection state being either a state of connecting to the network or a state of not connecting to the network; and a cutting-off means configured to force the network connection terminal to turn off. The cutting-off means forces the network connection terminal to turn off when the operation, the instruction of which is received by the receiving means, is an operation for turning on the network connection terminal and the connection checking means confirms that the connecting means is not connected to the network as a result of the check of the connection state.

Here, the network connection terminal may further include: a broadcast receiving means configured to receive a broadcast; and a displaying means configured to display the received broadcast. Until the connection checking means performs the check of the connection state, the displaying means displays the received broadcast, which is received by the broadcast receiving means.

Here, the network connection terminal may further include: a video storing means configured to store video; and a displaying means configured to display the stored video. The displaying means displays the stored video, which is stored by the video storing means, before the cutting-off means forces the network connection terminal to turn off and after the connection checking means confirms that the connecting means is not connected to the network as a result of the check of the connection state.

Here, the network connection terminal may further include a broadcast receiving means configured to receive a broadcast. The displaying means displays the stored video, which is stored by the video storing means, after the connection checking means confirms that the connecting means is not connected to the network as a result of the check of the connection state, and after the displaying means displays the stored video, instead of the cutting-off means forcing the network connection terminal to turn off, the display means displays the received broadcast, which is received by the broadcast receiving means.

Here, the network connection terminal may further include: a message storing means configured to store a message; and a displaying means configured to display the stored message. The displaying means displays the stored message, which is stored by the message storing means, before the cutting-off means forces the network connection terminal to turn off and after the connection checking means confirms that the connecting means is not connected to the network as a result of the check of the connection state.

Here, the network connection terminal may further include a broadcast receiving means configured to receive a broadcast. The displaying means displays the stored message, which is stored by the message storing means, after the connection checking means confirms that the connecting means is not connected to the network as a result of the check of the connection state, and after the displaying means displays the stored message, instead of the cutting-off means forcing the network connection terminal to turn off, the displaying means displays the received broadcast, which is received by the broadcast receiving means.

Here, the network connection terminal may further include: a record storing means configured to store a past record of connection to the network; and a judging means configured to judge whether or not the network connection terminal is to be turned off. The judging means judges whether or not the record stored by the record storing means fulfills a predetermined condition, and the cutting-off means forces the network connection terminal to turn off when the judging means judges that the record does not fulfill the predetermined condition.

Here, the network connection terminal further include: a permission information storing means configured to store permission information; and a permission information checking means configured to check the permission information. The cutting-off means forces the network connection terminal to turn off when the permission information checking means confirms that the permission information does not exist or that the permission information is invalid.

Here, the network connection terminal may further include a permission information receiving means configured to receive the permission information. The permission information receiving means receives the permission information from another terminal by utilizing wireless communication and stores the permission information therein.

Here, the network connection terminal may further include: an information storing means configured to acquire information from broadcast waves or other media, and to store the acquired information; and a judging means configured to judge whether or not the network connection terminal is to be turned off. The judging means judges whether or not the acquired information, which is stored by the information storing means, is in accordance with a predetermined condition, and the cutting-off means forces the network connection terminal to turn off when the judging means judges that the acquired information is not in accordance with the predetermined condition.

Here, when the connection checking means confirms that the connecting means is not connected to the network as a result of the check of the connection state, instead of the cutting-off means forcing the network connection terminal to turn off, the network connection terminal is kept in a turned-on state with some functions of the network communication terminal being enabled while the rest of the functions of the network connection terminal are disabled.

Here, the network connection terminal may further include a state storing means configured to store the connection state to the network. The connection checking means performs a periodical check of the connection state, the state storing means stores the results of the periodical check of the connection state, and the check performed by the connection checking means when the receiving means receives the operation for turning on the network connection terminal is performed based on the latest results of the periodical check of the connection state stored by the state storing means.

(8) Part or all of the structural elements of each of the above devices may be composed of an IC card detachable from the device or a single module. The IC card or the module is a computer system composed of a microprocessor, a ROM, a RAM, and so on. The IC card or the module may include a super multifunctional LSI. Functions of the IC card or the module are achieved by the microprocessor operating in accordance with a computer program. The IC card or the module may be each tamper-resistant.

(9) Each of the above devices may be a computer system that includes a microprocessor and a memory. The memory stores therein the computer program, and the microprocessor operates in accordance with the computer program.

Here, the computer program is composed of combinations of instruction codes each indicating an instruction to a computer so as to achieve predetermined functions. The microprocessor fetches the instructions contained in the computer program one by one, decodes the read instructions, and operates in accordance with a result of the decoding.

Furthermore, the computer program may be recorded in a computer-readable recording medium such as a flexible disk, a hard disk, a CD-ROM, an MO, a DVD, a DVD-ROM, a DVD-RAM, a Blu-ray Disc, and a semiconductor memory.

Also, the computer program may be transmitted via an electric communication network, a wireless or wired communication network, a network such as the Internet, data broadcasting, or the like.

Furthermore, the present invention may be implemented by another computer system, by transmitting the computer program recorded in the recording medium to the other computer system, or by transmitting the computer program to the other computer system via the network.

(10) The present invention may be any combination of the above embodiments and modification examples.

The terminal device relating to the present invention exhibits an effect that forces a user to make network connection. The present invention is useful as an art of forcing a terminal device that is not connected to a network and has a network interface to make network connection.

REFERENCE SIGNS LIST 10 content transmission and reception system
20 network
100 TV receiver
101 control unit
102 storage unit
103 communication unit
104 broadcast wave reception unit
105 decoding unit
106 playback unit
107 display unit
108 input reception unit
109 connection check unit
110 power unit
111 remote control
112 antenna
113 update unit
114 button operation unit
200 server device
201 control unit
202 storage unit
203 communication unit

The invention claimed is:

1. A terminal device that has a network interface, the terminal device comprising:
a microprocessor; and
a non-transitory computer-readable recording medium coupled to the microprocessor storing computer-executable instructions thereon, wherein the instructions when executed by the microprocessor cause the terminal device to:
check whether the terminal device is connected to a network;
when it is judged that the terminal device is not connected to the network as a result of the check, play back one of a special video and a warning text that indicate that the terminal device is not connected to the network; and
after the play back of one of the special video and the warning text, invalidate a function included in the terminal device without turning off,
wherein the terminal device is a computer system that includes a memory that stores therein a control program, the microprocessor executing the control program, and
causing the terminal device to further:
acquire permission information;
play back a message; and
receive an operation instruction from a user,
wherein the acquired permission information includes an update program for updating the control program, and indicates to exempt the terminal device from function invalidation on a condition that the control program is updated with use of the update program,
when it is judged that the terminal device is not connected to the network, the microprocessor causes the terminal device to:
play back the message for inquiring of the user as to whether to update the control program with use of the update program;
when the operation instruction indicates not to update the control program, invalidate the function included in the terminal device; and
when the operation instruction indicates to update the control program, update the control program with use of the update program and validate the function included in the terminal device.

2. The terminal device of claim 1, wherein the microprocessor causes the terminal device to further:
receive an operation instruction from a user, wherein
when the operation instruction indicates to make an operation for power-on, the connection is checked immediately after supply of electrical power to the terminal device is commenced.

3. The terminal device of claim 1, wherein
the microprocessor causes the terminal device to further:
receive a broadcast wave via a broadcast that is received on a different channel from that used by the network;
extract a program from the received broadcast wave;
play back the extracted program; and
in a time period in which the connection is checked and concurrently with the check, control the terminal device to receive the broadcast wave, extract the program from the received broadcast wave, and play back the extracted program, and
when it is judged that the terminal device is not connected to the network after elapse of the time period, control the terminal device to stop receiving the broadcast wave, stop extracting the program, and stop playing back the extracted program, and
the terminal device is a broadcast wave reception device.

4. The terminal device of claim 1, wherein the microprocessor causes the terminal device to further:
when it is judged that the terminal device is not connected to the network, play back a message for inquiring of a user as to whether to make settings for network connection; and
receive an operation instruction from the user, wherein
when the received operation instruction indicates not to make the settings for network connection, the microprocessor causes the terminal device to invalidate the function included in the terminal device.

5. The terminal device of claim 1, further comprising
a storage unit that stores therein, for each of a plurality of times of checks of the connection, a piece of connection information indicating whether the terminal device has been connected to the network, wherein
the microprocessor compares a rate of pieces of connection information indicating that the terminal device has been connected to the network among all of the pieces of connection information to a threshold value,
when the rate of pieces of connection information indicating that the terminal device has been connected to the network does not exceed the threshold value and it is judged that the terminal device is not connected to the network, the microprocessor causes the terminal device to invalidate the function included in the terminal device.

6. The terminal device of claim 1, wherein the microprocessor causes the terminal device to further:
acquire permission information indicating whether to exempt the terminal device from function invalidation, wherein
when the acquired permission information does not indicate to exempt the terminal device from function invalidation and it is judged that the terminal device is not connected to the network, the microprocessor causes the terminal device to invalidate the function included in the terminal device.

7. The terminal device of claim 1, wherein the terminal device is a computer system that includes a memory that stores therein a control program, the microprocessor executing the control program and causing the terminal device to further:
acquire permission information;
play back a message; and
receive an operation instruction from a user,
wherein the acquired permission information includes an update program for updating the control program, and indicates to exempt the terminal device from function invalidation on a condition that the control program is updated with use of the update program,
when it is judged that the terminal device is not connected to the network, the microprocessor causes the terminal device to:
play back the message for inquiring of the user as to whether to update the control program with use of the update program; and
when the operation instruction indicates not to update the control program, invalidate the function included in the terminal device.

8. A control method for use in a terminal device that has a network interface, the control method comprising:
checking whether the terminal device is connected to a network;
when it is judged that the terminal device is not connected to the network as a result of the checking, playing back one of a special video and a warning text that indicate that the terminal device is not connected to the network; and
after the play back of one of the special video and the warning text, invalidating a function included in the terminal device without turning off;
wherein the terminal device is a computer system that includes a memory that stores therein a control program, the microprocessor executing the control program, and
causing the terminal device to perform further step comprising:
acquiring permission information;
playing back a message; and
receiving an operation instruction from a user,
wherein the acquired permission information includes an update program for updating the control program, and indicates to exempt the terminal device from function invalidation on a condition that the control program is updated with use of the update program,
when it is judged that the terminal device is not connected to the network, the microprocessor causes the terminal device to:
play back the message for inquiring of the user as to whether to update the control program with use of the update program;
when the operation instruction indicates not to update the control program, invalidate the function included in the terminal device; and
when the operation instruction indicates to update the control program, update the control program with use of the update program and validate the function included in the terminal device.

9. A non-transitory computer-readable recording medium that records therein a computer program for control for use in a terminal device that has a network interface, the computer program causing the terminal device that is a computer to perform steps comprising:
checking whether the terminal device is connected to a network;
when it is judged that the terminal device is not connected to the network as a result of the checking, playing back one of a special video and a warning text that indicate that the terminal device is not connected to the network; and
after the play back of one of the special video and the warning text, invalidating a function included in the terminal device without turning off,
wherein the terminal device is a computer system that includes a memory that stores therein a control program, the microprocessor executing the control program, and
causing the terminal device to perform further step comprising:
acquiring permission information;
playing back a message; and
receiving an operation instruction from a user,
wherein the acquired permission information includes an update program for updating the control program, and indicates to exempt the terminal device from function invalidation on a condition that the control program is updated with use of the update program,
when it is judged that the terminal device is not connected to the network, the microprocessor causes the terminal device to:
play back the message for inquiring of the user as to whether to update the control program with use of the update program;
when the operation instruction indicates not to update the control program, invalidate the function included in the terminal device; and
when the operation instruction indicates to update the control program, update the control program with use of the update program and validate the function included in the terminal device.

10. The terminal device of claim 1, wherein
the terminal device includes a terminal connectable to an external device, and
when it is judged that the terminal device is not connected to the network, the microprocessor causes the terminal device to invalidate a function of displaying a video that is input from the terminal.

11. The terminal device of claim 3, wherein
the broadcast wave includes natural disaster information that indicates a status of a natural disaster,
the natural disaster information is extracted from the received broadcast wave, and
when the status indicated by the extracted natural disaster information does not satisfy a predetermined condition, the microprocessor causes the terminal device to invalidate the program playback so as not to play back the extracted natural disaster information.

* * * * *